United States Patent
Dhanapal

(10) Patent No.: US 8,949,206 B2
(45) Date of Patent: Feb. 3, 2015

(54) SYSTEM AND METHOD FOR CREATING MULTIPLE VERSIONS OF A DESCRIPTOR FILE

(71) Applicant: Telefonaktiebolaget L M Ericsson (Publ), Stockholm (SE)

(72) Inventor: Sathiyamoorthy Dhanapal, Duluth, GA (US)

(73) Assignee: Ericsson Television Inc., Duluth, GA (US)

( * ) Notice: Subject to any disclaimer, the term of this patent is extended or adjusted under 35 U.S.C. 154(b) by 69 days.

(21) Appl. No.: 13/644,792

(22) Filed: Oct. 4, 2012

(65) Prior Publication Data

US 2014/0101118 A1    Apr. 10, 2014

(51) Int. Cl.
*G06F 17/30* (2006.01)
*H04L 29/06* (2006.01)
*H04N 21/262* (2011.01)

(52) U.S. Cl.
CPC .......... *H04L 65/00* (2013.01); *H04N 21/26258* (2013.01)
USPC .......................................................... 707/695

(58) Field of Classification Search
None
See application file for complete search history.

(56) References Cited

U.S. PATENT DOCUMENTS

| | | | |
|---|---|---|---|
| 7,895,305 B2 * | 2/2011 | Beton et al. | 709/223 |
| 8,601,153 B2 * | 12/2013 | Choudhury et al. | 709/236 |
| 2003/0135553 A1 | 7/2003 | Pendakur | |
| 2003/0226151 A1 | 12/2003 | Hamada et al. | |
| 2007/0067482 A1 * | 3/2007 | Johnson et al. | 709/231 |
| 2007/0133609 A1 * | 6/2007 | Moore et al. | 370/484 |
| 2011/0196982 A1 | 8/2011 | Chen et al. | |
| 2011/0246563 A1 | 10/2011 | Keum et al. | |
| 2012/0096083 A1 * | 4/2012 | Teng et al. | 709/203 |
| 2013/0013800 A1 * | 1/2013 | Brueck et al. | 709/231 |
| 2013/0054958 A1 * | 2/2013 | Braness et al. | 713/150 |
| 2013/0091249 A1 * | 4/2013 | McHugh et al. | 709/219 |
| 2013/0117418 A1 * | 5/2013 | Mutton et al. | 709/219 |
| 2013/0142499 A1 * | 6/2013 | Major et al. | 386/341 |
| 2013/0227293 A1 * | 8/2013 | Leddy et al. | 713/176 |
| 2014/0019633 A1 * | 1/2014 | Zhang et al. | 709/231 |

FOREIGN PATENT DOCUMENTS

WO    WO 2011/087449 A1    7/2011

OTHER PUBLICATIONS

U.S. Appl. No. 61/556,236, filed Nov. 6, 2011.*
U.S. Appl. No. 61/556,237, filed Nov. 6, 2011.*
U.S. Appl. No. 61/567,513, filed Dec. 6, 2011.*
U.S. Appl. No. 61/670,997, filed Jul. 12, 2011.*
U.S. Appl. No. 61/672,622, filed Jul. 17, 2012.*

* cited by examiner

*Primary Examiner* — Jay Morrison

(57) ABSTRACT

A system (e.g., content management system, content delivery system) and method are described herein which are configured for receiving one or more source descriptor files (e.g., MPD files, HLS m3u8 files, HTTP manifest files) along with associated adaptive bit rate segments. The system and method are also configured for receiving rules (e.g., content ratings, timing information, user profiles, regional and demographic information) and then creating multiple descriptor files based on the received rules and the source descriptor file(s). The system and method are further configured for distributing the multiple descriptor files to one or more downstream systems (e.g., content to delivery systems, users).

26 Claims, 17 Drawing Sheets

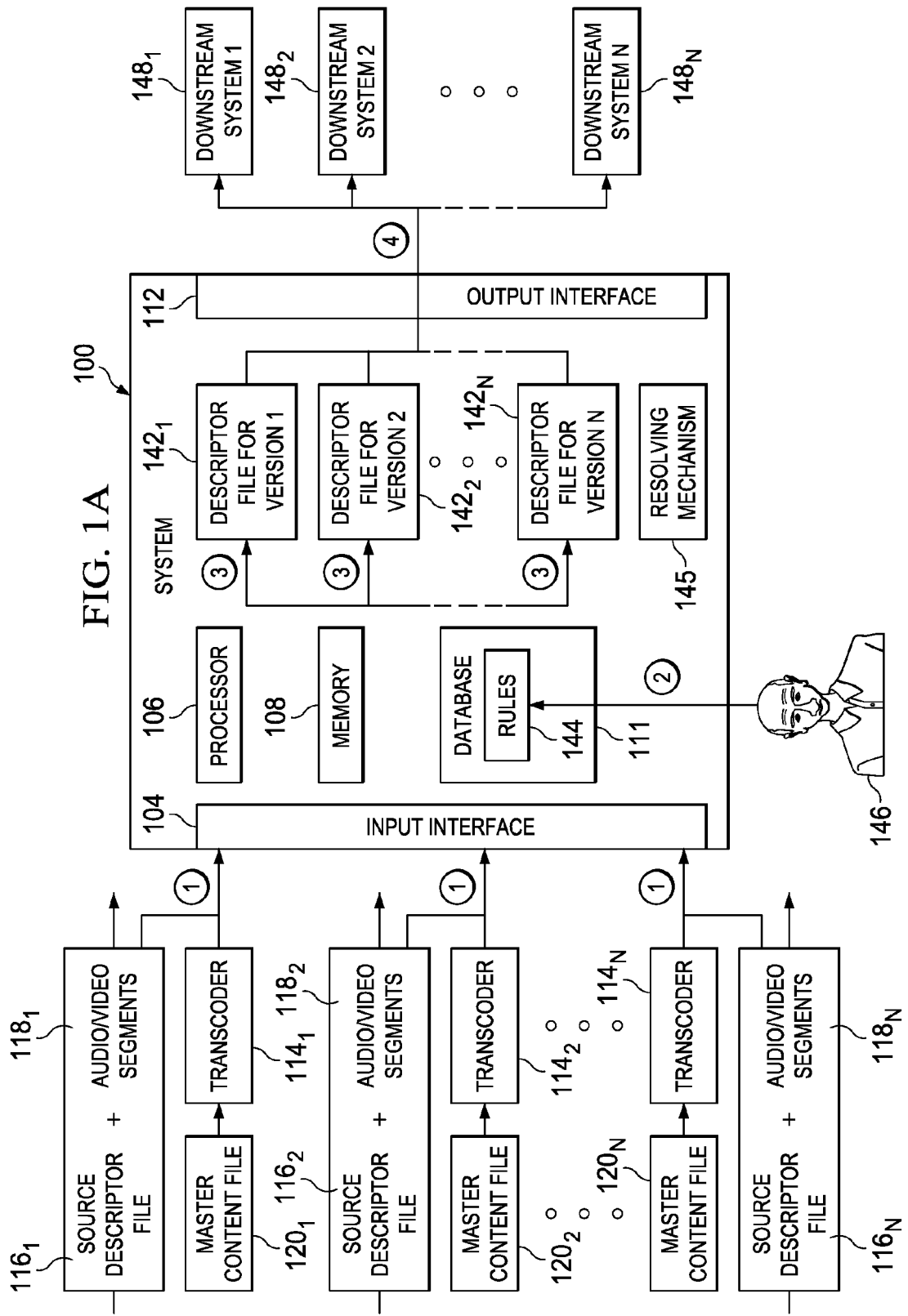

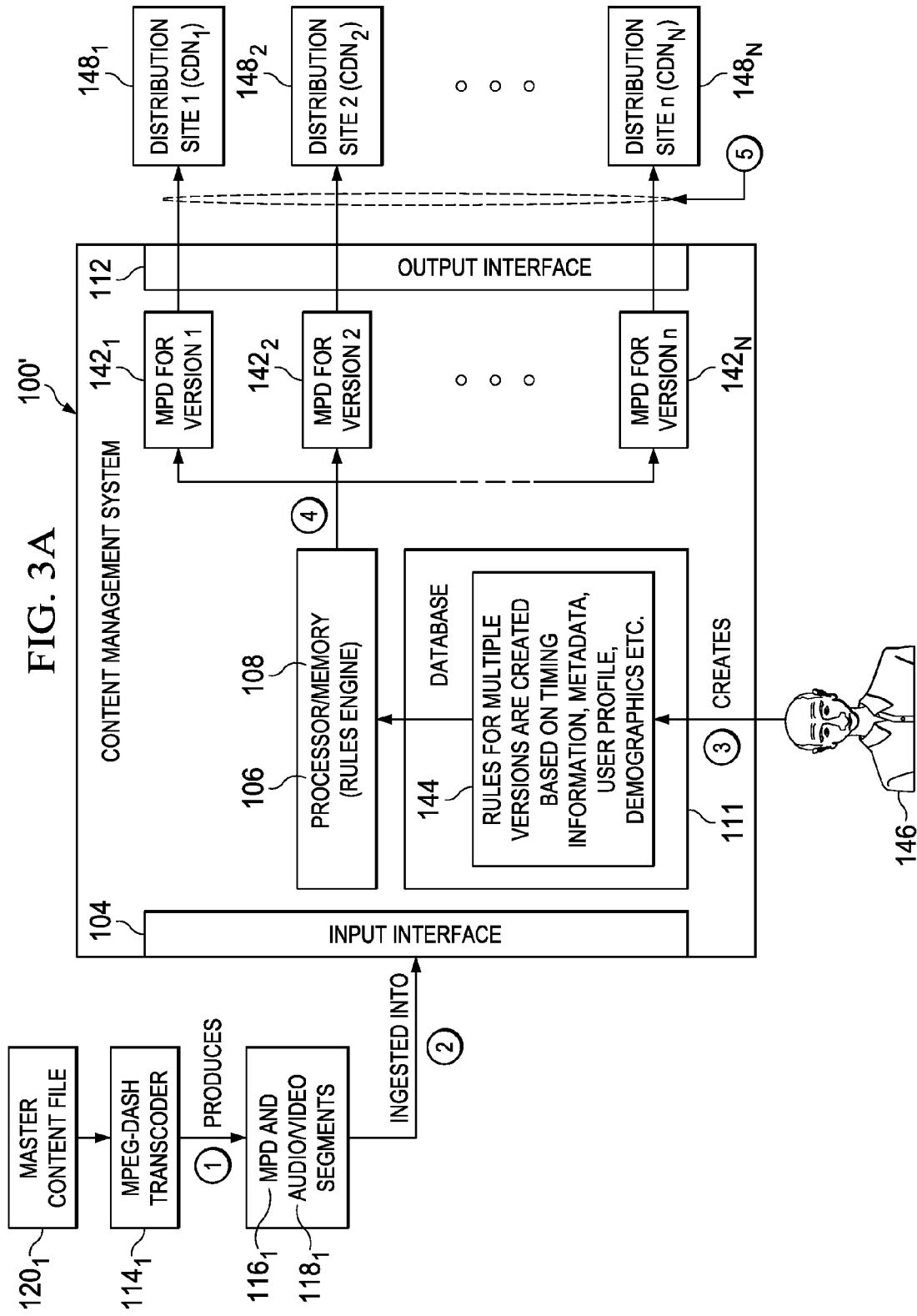

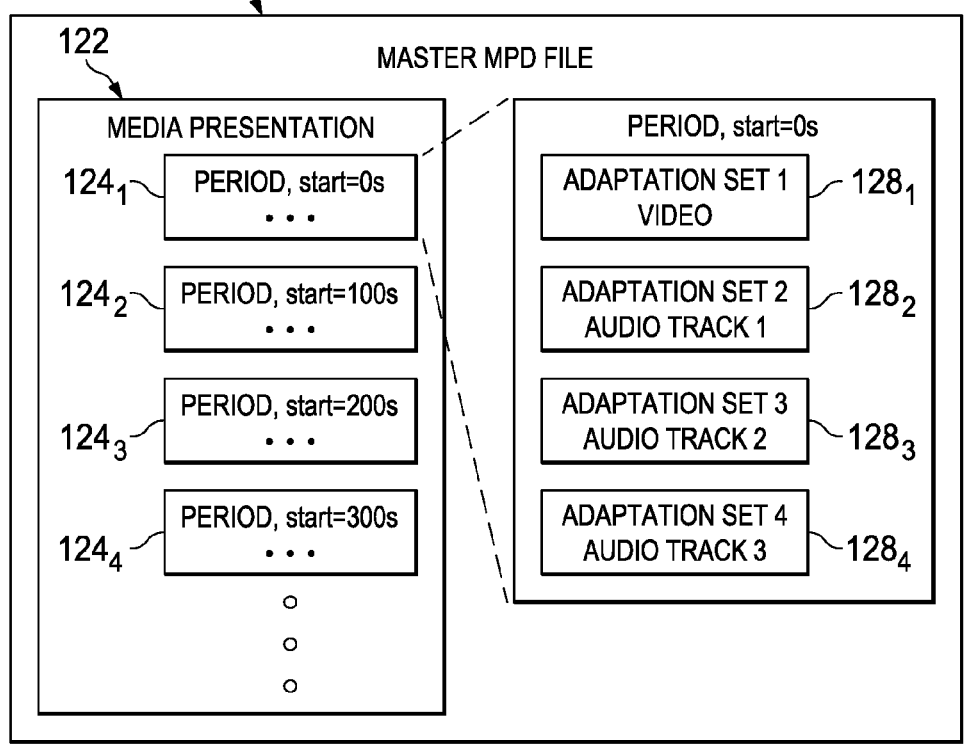

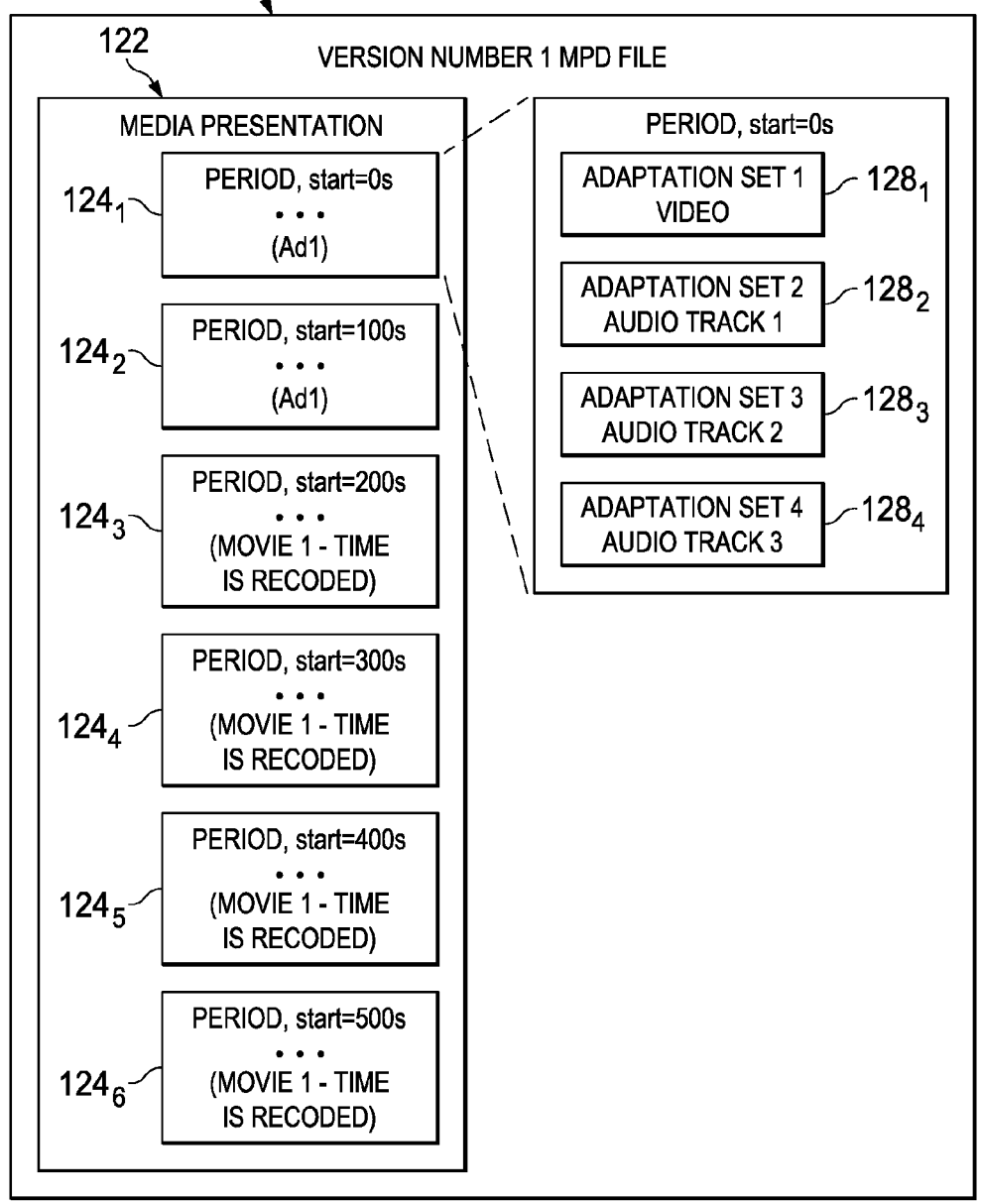

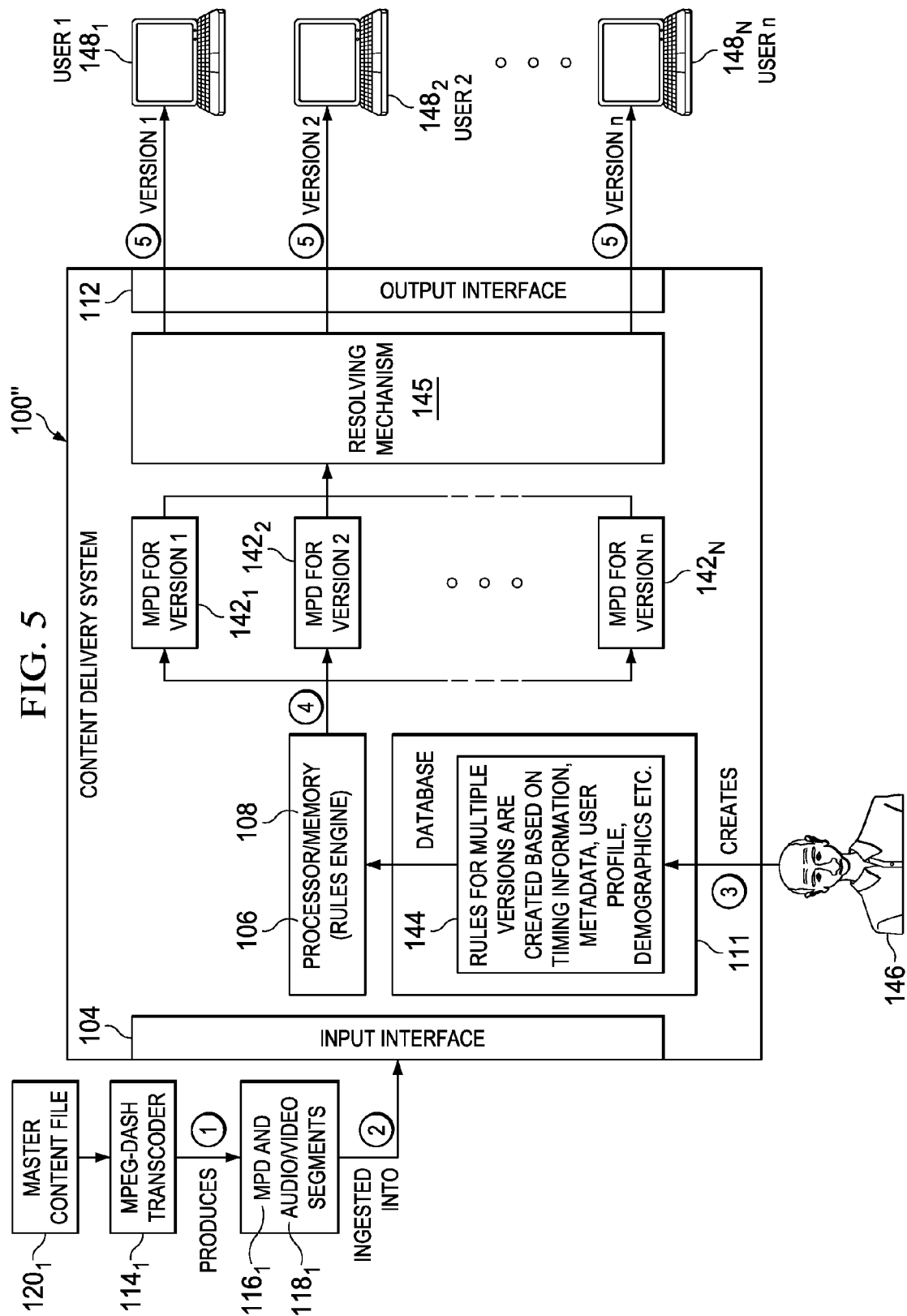

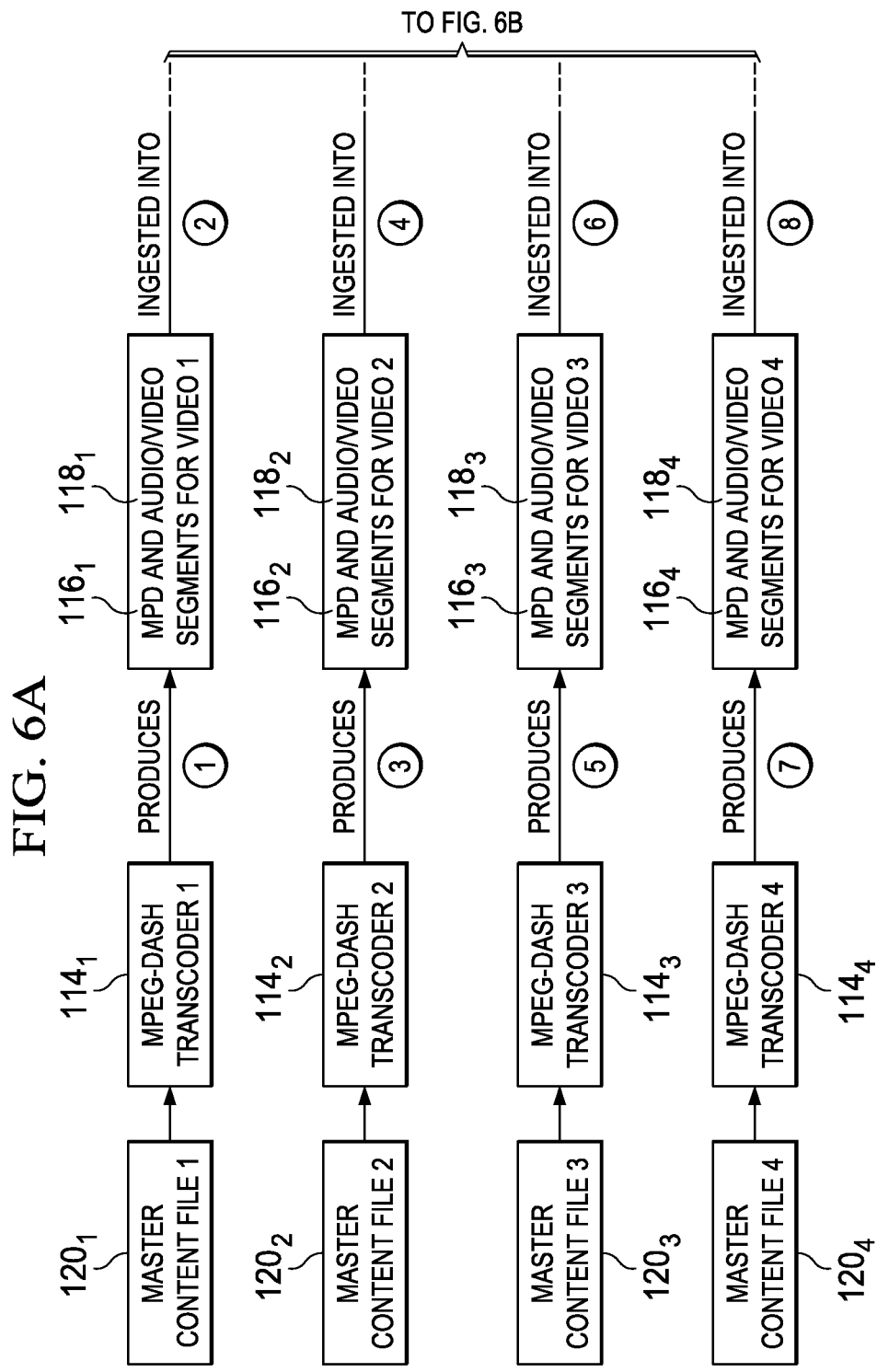

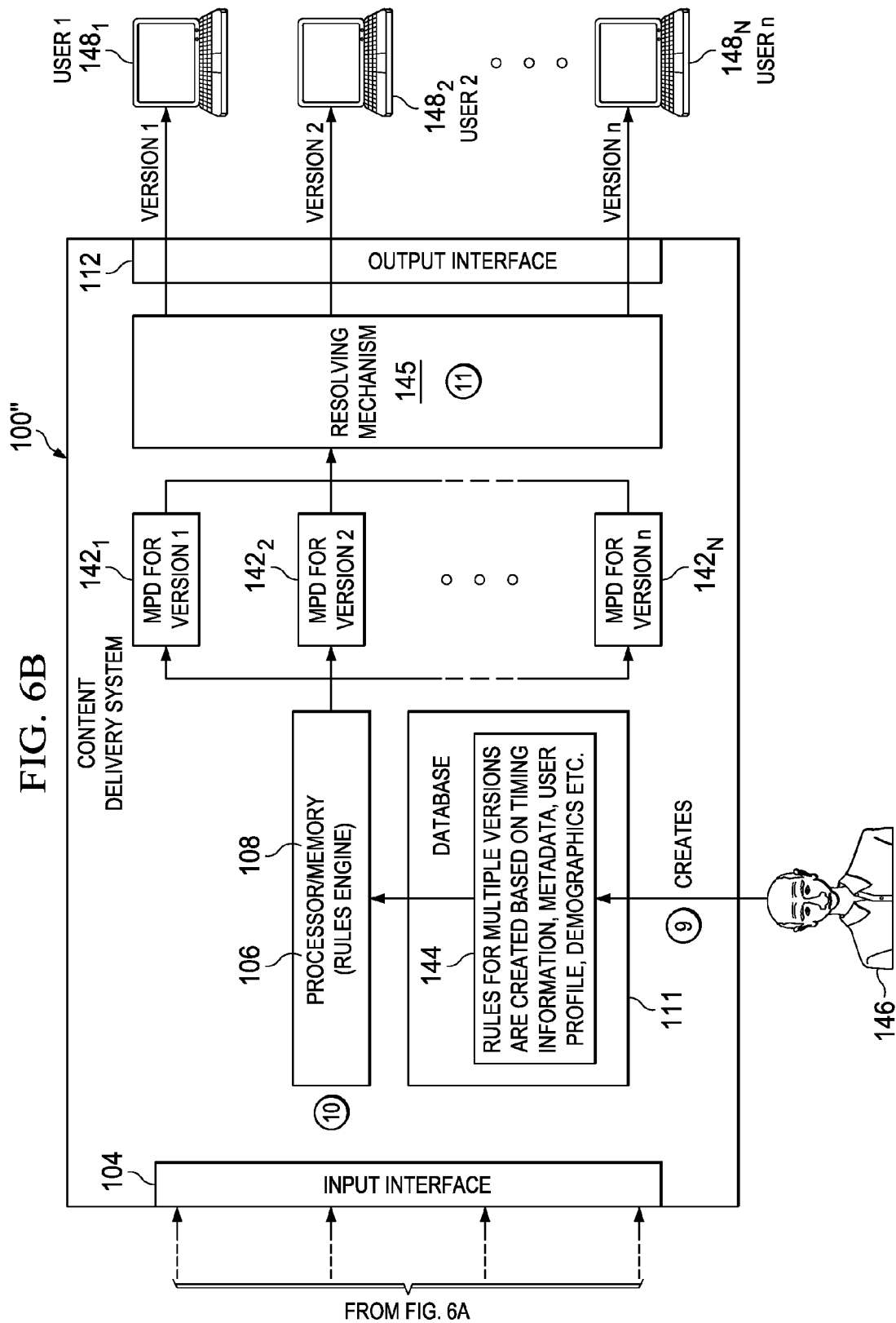

SYSTEM AND METHOD FOR CREATING MULTIPLE VERSIONS OF A DESCRIPTOR FILE

TECHNICAL FIELD

The present invention relates to system (e.g., content management system, content delivery system) and method configured for receiving one or more source descriptor files (e.g., MPD files, HLS m3u8 files, HTTP manifest files) along with associated adaptive bit rate segments. The system and method are also configured for receiving rules (e.g., content ratings, timing information, user profiles, regional and demographic information) and then creating multiple descriptor files based on the received rules and the source descriptor file(s). The system and method are further configured for distributing the multiple descriptor files to one or more downstream systems (e.g., content delivery systems, users).

BACKGROUND

The following abbreviations herewith defined are referred to within the following description about the prior art and the present invention.
DASH Dynamic Adaptive Streaming over HTTP
HLS HTTP Live Streaming
HTTP Hypertext Transfer Protocol
MPD Media Presentation Description
MPEG Moving Picture Experts Group DASH is a multimedia adaptive bit rate streaming technology where a multimedia content file (e.g., video, television, radio . . . ) is partitioned into segments and delivered to a client using HTTP. In particular, the multimedia content file is split into multiple segments and these segments are linked together by a MPD file which is sent to the client. The client uses the MPD file to request the segments of the multimedia content file. The MPD file contains information (timing, URL, media characteristics such as video resolution and bit rates) related to the one or more segments. Each segment can contain any type of media data, however the DASH specification provides specific guidance and formats for two types of containers namely the MPEG-4 file format or the MPEG-2 Transport Stream format. Furthermore, DASH is audio/video codec agnostic. Hence, one or more representations (i.e., different resolutions or bit rates) of the multimedia content file is typically available, and the selection of which multimedia content file's representation that is to be sent to the client can be made based on various factors such as the network conditions, the client's device capabilities, and the user preferences.

In the existing business process/technology, if a content management system (or content delivery system) wants to create multiple versions of the same multimedia content file (e.g., adult & non-adult versions, multiple language versions, subscription type version (standard vs. premium subscription)), then multiple content files with relevant audio/video tracks which are properly cut based on timings, need to be created. Since multiple content files are created from one master multimedia content file, it can be complicated for the content management system (or content delivery system) to maintain and track these different versions of the master multimedia content file. Plus, the storage requirements for the content management system (or content delivery system) can increase based on the number of versions of the master multimedia content file which need to be stored. In addition, the content management system (or content delivery system) needs to spend the time to create the new versions of the master multimedia content file. Accordingly, there has been and is a need to address these shortcomings and other shortcomings associated with the current multimedia adaptive bit rate streaming technology. This need and other needs are addressed by the present invention.

SUMMARY

A system and method which addresses several needs associated with the current multimedia adaptive bit rate streaming technology have been described in the independent claims of the present application. Advantageous embodiments of the system and method have been described in the dependent claims of the present application.

In one aspect, the present invention provides a system configured to create multiple descriptor files. The system comprises a processor and a memory that stores processor-executable instructions therein where the processor interfaces with the memory and executes the processor-executable instructions to enable following operations: (1) receiving one or more source descriptor files and associated adaptive bit rate segments for one or more master content files; (2) receiving rules which provide details on how the multiple descriptor files are to be created; (3) creating the multiple descriptor files based on the rules and the one and more source descriptor files; and (4) distributing one or more of the multiple descriptor files to one or more downstream systems. The system has an advantage in that by creating multiple descriptor files it avoids having to create multiple versions of the one or more master content files which saves time and reduces maintenance and storage costs.

In yet another aspect, the present invention provides a method for creating multiple descriptor files. The method is implemented by a system and comprises the steps of: (1) (1) receiving one or more source descriptor files and associated adaptive bit rate segments for one or more master content files; (2) receiving rules which provide details on how the multiple descriptor files are to be created; (3) creating the multiple descriptor files based on the rules and the one and more source descriptor files; and (4) distributing one or more of the multiple descriptor files to one or more downstream systems. The method has an advantage in that by creating multiple descriptor files it avoids having to create multiple versions of the one or more master content files which saves time and reduces maintenance and storage costs.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 1A is a diagram of an exemplary system (e.g., content management system, content delivery system) configured for creating multiple descriptor files in accordance with an embodiment of the present invention;

FIGS. 3A-3D are several diagrams associated with an exemplary content management system which are used to explain a use case #1 in accordance with an embodiment of the present invention;

FIGS. 4A-4H are several diagrams associated with an exemplary content management system which are used to explain a use case #2 in accordance with an embodiment of the present invention;

FIG. 5 is a diagram an exemplary content delivery system which is used to explain a use case #3 in accordance with an embodiment of the present invention; and FIGS. 6A-6B are diagrams of an exemplary content delivery system which is used to explain a use case #4 in accordance with an embodiment of the present invention.

DETAILED DESCRIPTION

Figure 1B:
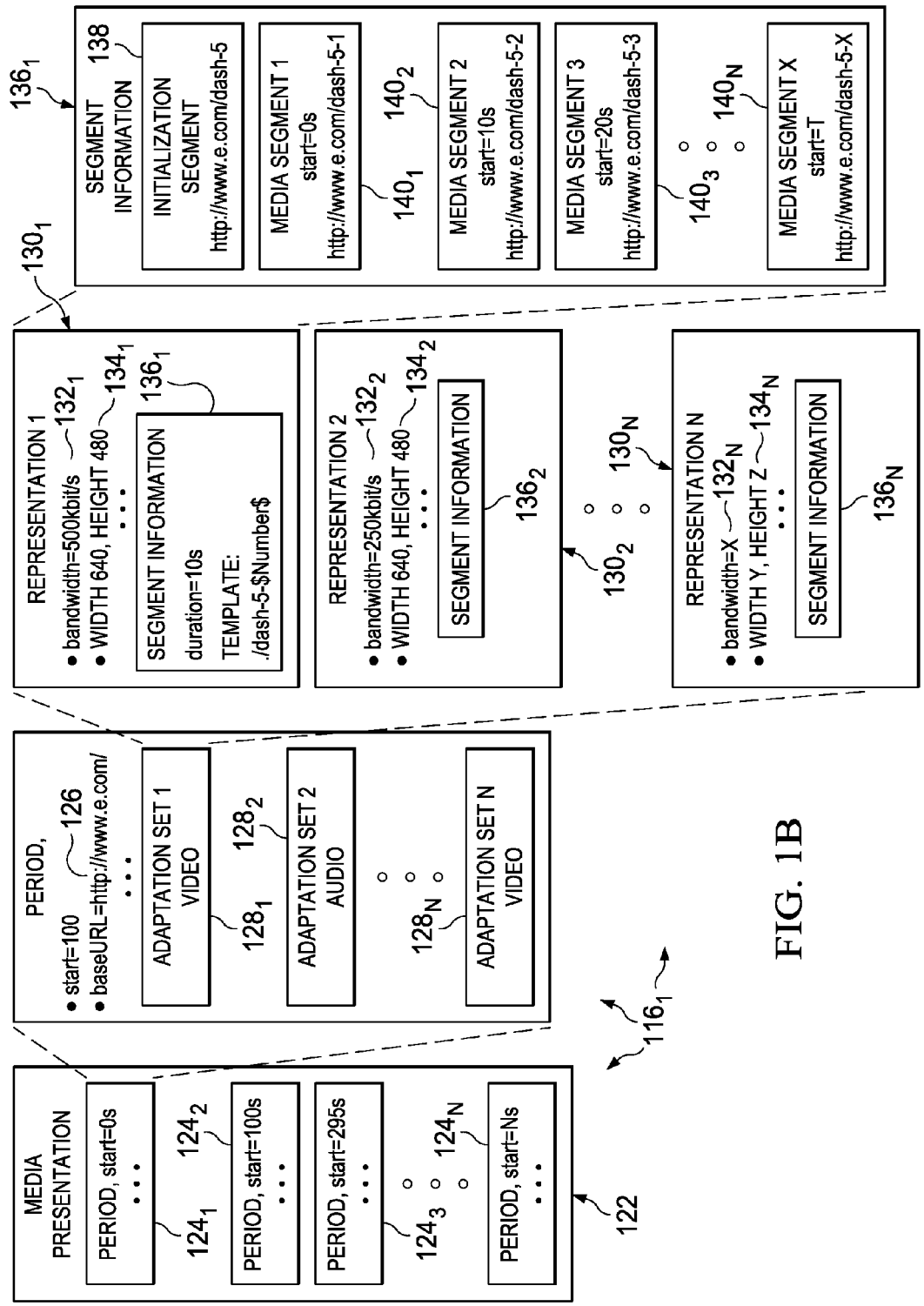
FIG. 1B is a diagram of an exemplary source descriptor file which is configured per the DASH standard and is known to those skilled in the art as a media presentation description (MPD) file.

Referring to FIG. 1A, there is shown a diagram of an exemplary system 100 configured in accordance with an embodiment of the present invention. As shown, the system 100 (e.g., content management system 100', content delivery system 100") includes an input interface 104, a processor 106, a memory 108, a database 111, and an output interface 112. The system 100 may include many other components which are well known in the art but for clarity those well known components are not described herein. In this example, the system's input interface 104 is configured to interface with one or more remote transcoders $114_1, 114_2 \ldots 114_n$ and receive therefrom one or more source descriptor files $116_1, 116_2 \ldots 116_n$ (e.g., MPD files, HLS m3u8 files, HTTP manifest files) and their associated adaptive bit rate segments $118_1, 118_2 \ldots 118_n$ (see step 1). As shown, the remote transcoders $114_1, 114_2 \ldots 114_n$ respectively receive the master content files $120_1, 120_2 \ldots 120_n$ and produce the corresponding source descriptor files $116_1, 116_2 \ldots 116_n$ and their associated adaptive bit rate segments $118_1, 118_2 \ldots 118_n$. An exemplary source descriptor file $116_1$ which is configured per the DASH standard is described next with respect to FIG. 1B.

Referring to FIG. 1B, there is a diagram of an exemplary source descriptor file $116_1$ which is configured per the DASH standard and is known to those skilled in the art as a MPD file $116_1$. The exemplary MPD file $116_1$ is a layered structure which includes a media presentation 122 which has multiple periods $124_1, 124_2, 124_3 \ldots 124_n$. The periods $124_1, 124_2, 124_3 \ldots 124_n$ are spliced together into specific time periods and contain information about arbitrary content (e.g., URL's to the adaptive bit rate segments $118_1, 118_2 \ldots 118_n$). Each period $124_1$ (for example) has URL information 126 and one or more adaptation sets $128_1, 128_2 \ldots 128_n$ which indicate a selection of components/tracks. Each adaptation set 1 $128_1$ (for example) includes one or more representations $130_1, 130_2 \ldots 130_n$ each of which contains information about different bandwidths $132_1, 132_2 \ldots 132_n$ and associated formats $134_1, 134_2 \ldots 134_n$ for various segments $136_1, 136_2 \ldots 136_n$. Each representation $130_1$ (for example) contains initialization segment information 138 and multiple media segments $140_1, 140_2, 140_3 \ldots 140_n$ each of which contains timing information and a URL. As discussed in detail below, the system 100 is configured to exploit the layered structure of the MPD file $116_1$ (or multiple MPD files $116_2 \ldots 116_n$) in a unique manner to obtain different MPD files $142_1, 142_2 \ldots 142_n$ rather than have to create different media content files as was needed in the state-of-the-art whenever one wanted multiple versions of the same multimedia content file (e.g., adult & non-adult versions, multiple language versions, subscription type version (standard vs. premium subscription)), To accomplish this, the system's processor 106 interacts with the memory 108 which stores processor-executable instructions and executes the processor-executable instructions to enable the following operations: (1) receive the one or more source descriptor files $116_1, 116_2 \ldots 116_n$ and their associated adaptive bit rate segments $118_1, 118_2 \ldots 118_n$ for one or more master content files $120_1, 120_2 \ldots 120_n$ (FIG. 1A's step 1); (2) receive rules 144 which provide details on how the multiple descriptor files $142_1, 142_2 \ldots 142_n$ are to be created (FIG. 1A's step 2) (note: an operator 146 can provide the rules 144); (3) create the multiple descriptor files $142_1, 142_2 \ldots 142_n$ based on the rules 144 and the one and more source descriptor files $116_1, 116_2 \ldots 116_n$ (FIG. 1A's step 3); and (4) distribute one or more of the multiple descriptor files $142_1, 142_2 \ldots 142_n$ to one or more downstream systems $148_1, 148_2 \ldots 148_n$ (FIG. 1A's step 4). A more detailed discussion about this process including several additional features related to creating the multiple descriptor files $142_1, 142_2 \ldots 142_n$ is provided below with respect to a method 200 shown in FIGS. 2A-2B and to exemplary use cases 1-4 shown in FIGS. 3-6.

Figure 2A:
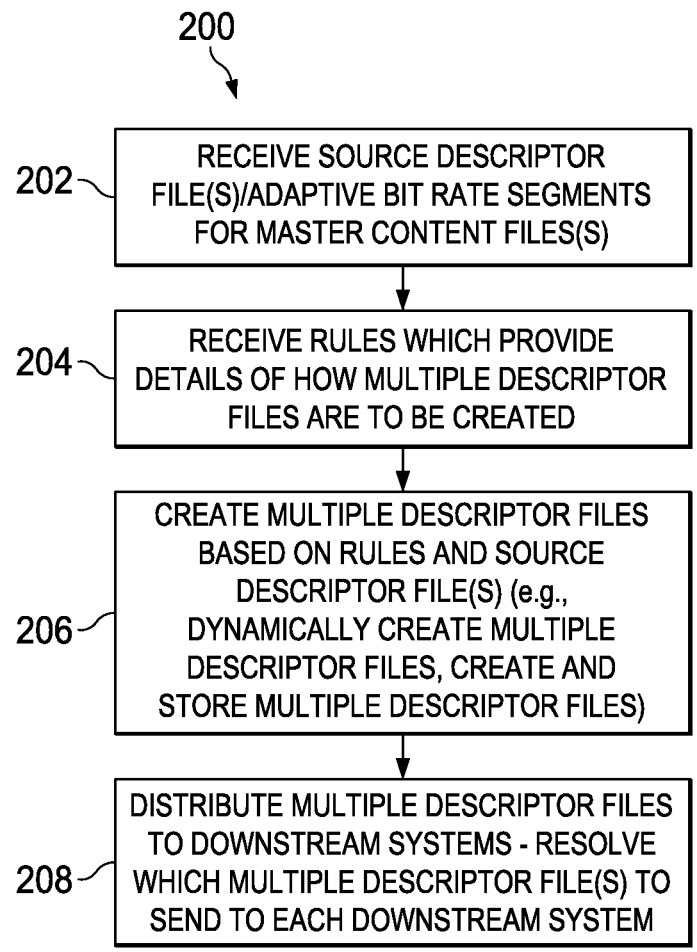
FIG. 2A is a flowchart of an exemplary method which is implemented by the system shown in FIG. 1A for creating multiple descriptor files in accordance with an embodiment of the present invention.

Referring to FIG. 2A, there is a flowchart of an exemplary method 200 which is implemented by the system 100 for creating multiple descriptor files $142_1, 142_2 \ldots 142_n$ in accordance with an embodiment of the present invention. At step 202, the system 100 receives the one or more source descriptor files $116_1, 116_2 \ldots 116_n$ and their associated adaptive bit rate segments $118_1, 118_2 \ldots 118_n$ for one or more master content files $120_1, 120_2 \ldots 120_n$. For instance, the source descriptor file(s) $116_1, 116_2 \ldots 116_n$ may be configured as MPD files, HLS m3u8 files, or HTTP manifest files depending on the particular streaming technology used by the transoders $114_1, 114_2 \ldots 114_n$. At step 204, the system 100 receives rules 144 which provide details on how the multiple descriptor files $142_1, 142_2 \ldots 142_n$ are to be created. The operator 146 can provide the rules 144 which include a wide variety of information/criteria that dictates how to create the multiple descriptor files $142_1, 142_2 \ldots 142_n$. For instance, the rules 144 can include information/criteria related to content ratings, language information, timing information, metadata, user profiles, and regional and demographic information. At step 206, the system 100 creates the multiple descriptor files $142_1, 142_2 \ldots 142_n$ based on the rules 144 and the one and more source descriptor files $116_1, 116_2 \ldots 116_n$ and associated adaptive bit rate segments $118_1, 118_2 \ldots 118_n$ (see FIG. 2B for a more detailed discussion about different features of the creating step 206). At step 208, the system 100 distributes the one or more of the multiple descriptor files $142_1, 142_2 \ldots 142_n$ to one or more downstream systems $148_1, 148_2 \ldots 148_n$. If the system 100 does not send all of the of the multiple descriptor files $142_1, 142_2 \ldots 142_n$ to each downstream systems $148_1, 148_2 \ldots 148_n$, then the system 100 would utilize a resolve mechanism 145 to determine which of the multiple descriptor files $142_1, 142_2 \ldots 142_n$ to send to each downstream system $148_1, 148_2 \ldots 148_n$ (see FIGS. 5-6 for more detailed discussion).

Figure 2B:
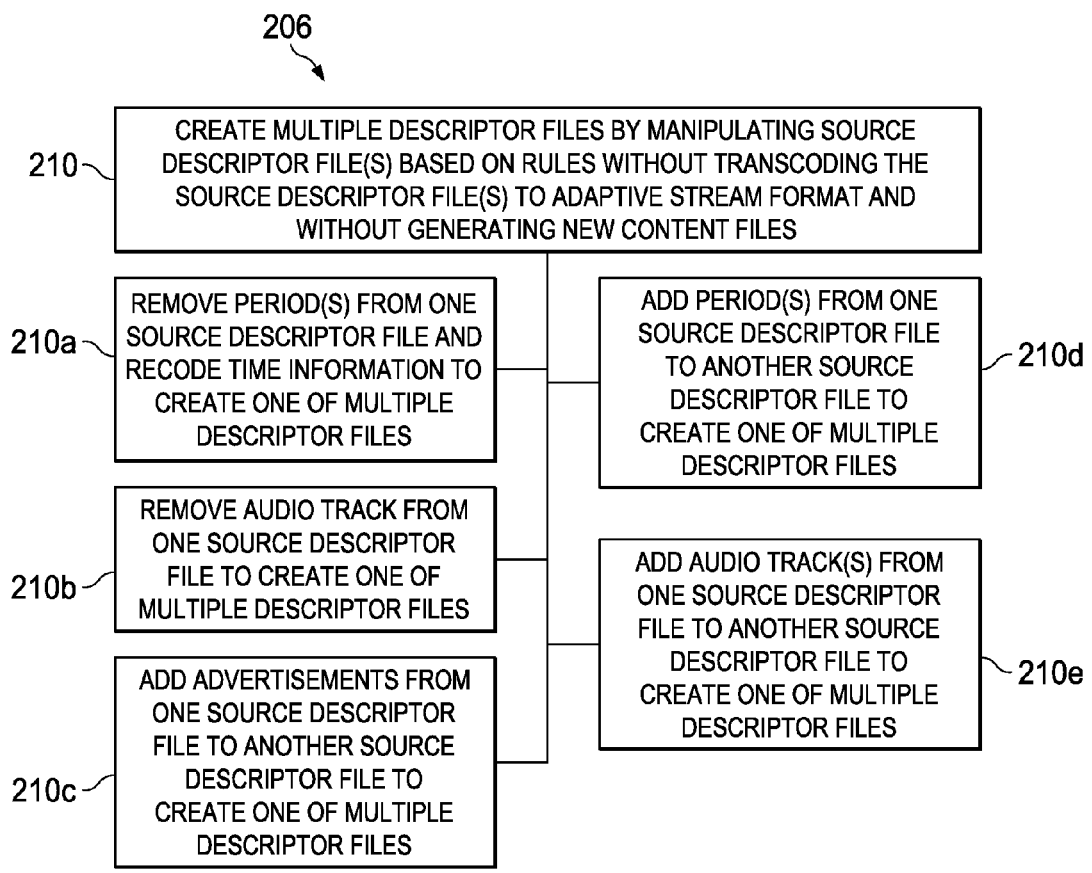
FIG. 2B is a flowchart illustrating in greater detail the steps associated with the creating step of the method shown in FIG. 2A in accordance with an embodiment of the present invention.

Referring to FIG. 2B, there is a flowchart illustrating in greater detail several exemplary steps associated with the creating step 206 shown in FIG. 2A in accordance with an embodiment of the present invention. As described above, the system 100 creates the multiple descriptor files 142$_1$, 142$_2$ ... 142$_n$ based on the rules 144 and the one and more source descriptor files 116$_1$, 116$_2$ ... 116$_n$. To accomplish this, the system 100 at step 210 manipulates one or more of the source descriptor files 116$_1$, 116$_2$ ... 116$_n$ based on the rules 144 without transcoding the source descriptor files 116$_1$, 116$_2$ ... 116$_n$ to an adaptive stream format and without generating new content files to create the multiple descriptor files 142$_1$, 142$_2$ ... 142$_n$. The system 100 can manipulate one or more of the source descriptor files 116$_1$, 116$_2$ ... 116$_n$ in a wide-variety of ways to create the multiple descriptor files 142$_1$, 142$_2$ ... 142$_n$ several exemplary ways are as follows:

The system 100 at step 210$a$ can remove at least one period 124$_1$, 124$_2$ ... 124$_n$ including a video track and an audio track from one of the source descriptor files 116$_1$, 116$_2$ ... 116$_n$ and recode the timing information within the one source descriptor file 116$_1$, 116$_2$ ... 116$_n$ to create one of the multiple descriptor files 142$_1$, 142$_2$ ... 142$_n$ (see use cases 1 and 3).

The system 100 at step 210$b$ can remove an audio track from one of the source descriptor files 116$_1$, 116$_2$ ... 116$_n$ to create one of the multiple descriptor files 142$_1$, 142$_2$ ... 142$_n$ (see use cases 1 and 3).

The system 100 at step 210$c$ can add advertisements from one or more of the source descriptor files 116$_1$, 116$_2$ ... 116$_n$ to another one of the source descriptor files 116$_1$, 116$_2$ ... 116$_n$ to create one of the multiple descriptor files 142$_1$, 142$_2$ ... 142$_n$ (see use cases 2 and 4).

The system 100 at step 210$d$ can add one or more periods 124$_1$, 124$_2$ ... 124$_n$ each including a video track and an audio track from one of source descriptor files 116$_1$, 116$_2$ ... 116$_n$ to one of the other source files 116$_1$, 116$_2$ ... 116$_n$ to create one of the multiple descriptor files 142$_1$, 142$_2$ ... 142$_n$ (see use cases 2 and 4).

The system 100 at step 210$e$ can add one or more audio tracks from one or more of the source descriptor files 116$_1$, 116$_2$ ... 116$_n$ to one of the other source files 116$_1$, 116$_2$ ... 116$_n$ to create one of the multiple descriptor files 142$_1$, 142$_2$ ... 142$_n$ (see use cases 2 and 4).

Figure 3C:
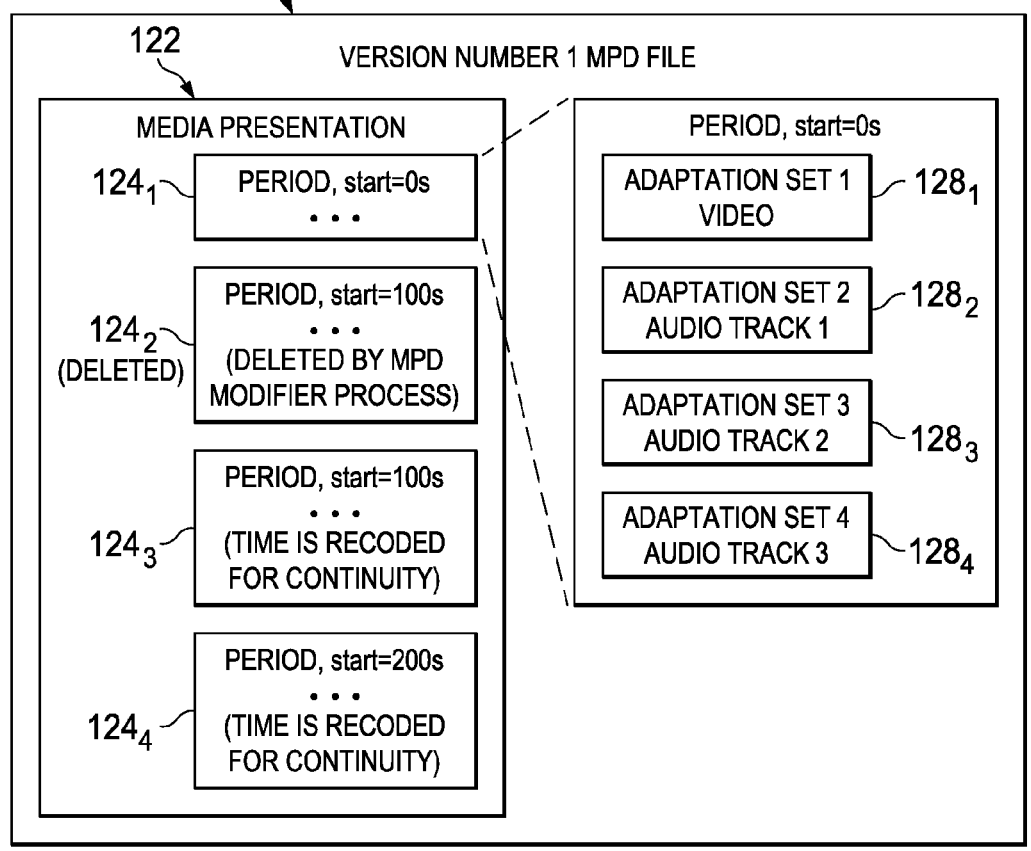

Referring to FIGS. 3A-3D, there are several diagrams associated with an exemplary content management system 100' which are used to explain a use case #1 in accordance with an embodiment of the present invention. As shown in FIG. 3A, the content management system 100' includes the input interface 104, the processor 106, the memory 108, the database 1111, and the output interface 112. In this particular example, the system's input interface 104 is shown interfacing with one remote transcoder 114$_1$ and receiving therefrom one source descriptor file 116$_1$ (MPD file 116$_1$) and the associated adaptive bit rate segments 118$_1$. The remote transcoder 114$_1$ receives the master content file 120$_1$ and produces the corresponding source descriptor file 116$_1$ and the associated adaptive bit rate segments 118$_1$. The basic steps associated with the use case #1 are as follows:

1. The MPEG-DASH transcoder 114$_1$ provides the MPD file 116$_1$ and the adaptive bit rate segments 118$_1$ for the master content file 120$_1$.
2. The MPEG-DASH transcoder's 114$_1$ output namely the MPD file 116$_1$ and the adaptive bit rate segments 118$_1$ are received by the content management system 100'. Note: The MPD file 116$_1$ and the adaptive bit rate segments 118$_1$ can be received from any other device as well instead of the MPEG-DASH transcoder 114$_1$.
3. The user 146 creates rules 144 which provide details on how to create the multiple versions of MPD files 142$_1$, 142$_2$ ... 142$_n$. The rules 144 can be and not limited to, based on timing information, metadata, user profiles, content ratings, regional and demographic information etc.
4. The processor 106-memory 108 (e.g., rules engine) uses the rules 144, the MPD file 116$_1$ and the adaptive bit rate segments 118$_1$ to create the multiple versions of MPD files 142$_1$, 142$_2$ ... 142$_n$.

Figure 3D:
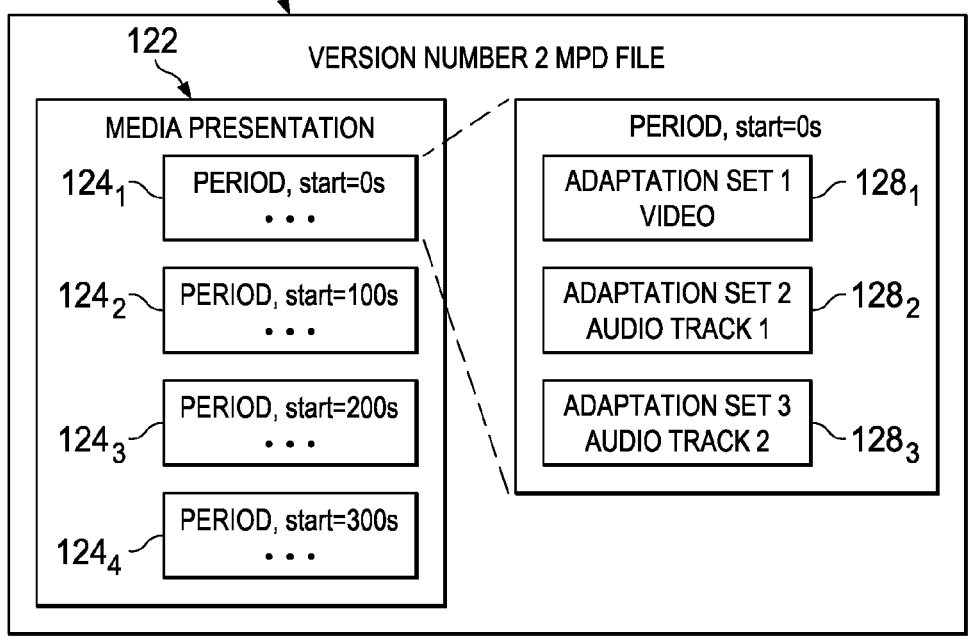

An example is discussed next to help explain several ways that the processor 106-memory 108 (e.g., rules engine) can use the rules 144 and the MPD file 116$_1$ to create the multiple versions of MPD files 142$_1$, 142$_2$ ... 142$_n$. In this example, FIG. 3B illustrates a portion of the MPD file 116$_1$ (e.g., master MPD file 116$_1$) which has a media presentation 122 with multiple periods 124$_1$, 124$_2$, 124$_3$, 124$_4$ and the first period 124$_1$ includes adaptation sets 128$_1$, 128$_2$, 128$_3$, 128$_4$. FIG. 3C illustrates a portion of the "version 1" MPD file 142$_1$ which was created by the processor 106-memory 108 (e.g., rules engine) when using the rule 144 which is set to remove the period 124$_2$ with time codes 100s to 199s from the MPD file 116$_1$ and to recode the time in the newly created "version 1" MPD file 142$_1$. The "version 1" MPD file 142$_1$ includes a media presentation 122 with multiple periods 124$_1$, 124$_3$, 124$_4$ where new time codes 100s and 200s are associated with periods 124$_3$ and 124$_4$. FIG. 3D illustrates a portion of the "version 2" MPD file 142$_2$ which was created by the processor 106-memory 108 (e.g., rules engine) when using the rule 144 which is set to remove audio track 3. The "version 2" MPD file 142$_2$ include a media presentation 122 with multiple periods 124$_1$, 124$_2$, 124$_3$, 124$_4$ and the first period 124$_1$ now includes adaptation sets 128$_1$, 128$_2$, 128$_3$, and no longer includes adaptation set 128$_4$ (note: the other periods 124$_2$, 124$_3$, 124$_4$ no longer include adaptation set 128$_4$).

5. The processor 106-memory 108 then distributes the different versions of MPD files 142$_1$, 142$_2$ ... 142$_n$ to corresponding downstream systems 148$_1$, 148$_2$ ... 148$_n$ (e.g., content delivery networks 148$_1$, 148$_2$ ... 148$_n$) based on requirements.

Note 1: In FIG. 3A, versioned MPD files 142$_1$, 142$_2$ ... 142$_n$ are presented as output of the processor 106-memory 108 (e.g., rule engine). In this case, the processor 106-memory 108 (e.g., rule engine) dynamically generates the versioned MPD files 142$_1$, 142$_2$ ... 142$_n$ on the fly and distributes them to the corresponding downstream systems 148$_1$, 148$_2$ ... 148$_n$. Alternatively, the processor 106-memory 108 (e.g., rule engine) can generate and store (cache) the versioned MPD files 142$_1$, 142$_2$ ... 142$_n$ in the database 111 and then at some later time distribute them to the corresponding downstream systems 148$_1$, 148$_2$ ... 148$_n$.

Note 2: The exemplary system 100' may include many other well known components but for clarity those well known components are not described herein while the components 104, 106, 108, 111 and 112 which are relevant to the invention have been described.

Note 3: The use case #1 included an example utilizing the DASH standard but it should be appreciated that the present invention is not limited to the DASH standard but could utilize other adaptive streaming technologies such as HLS by Apple, Smooth Streaming by Microsoft, or HDS by Adobe.

Figures 1, 4A:
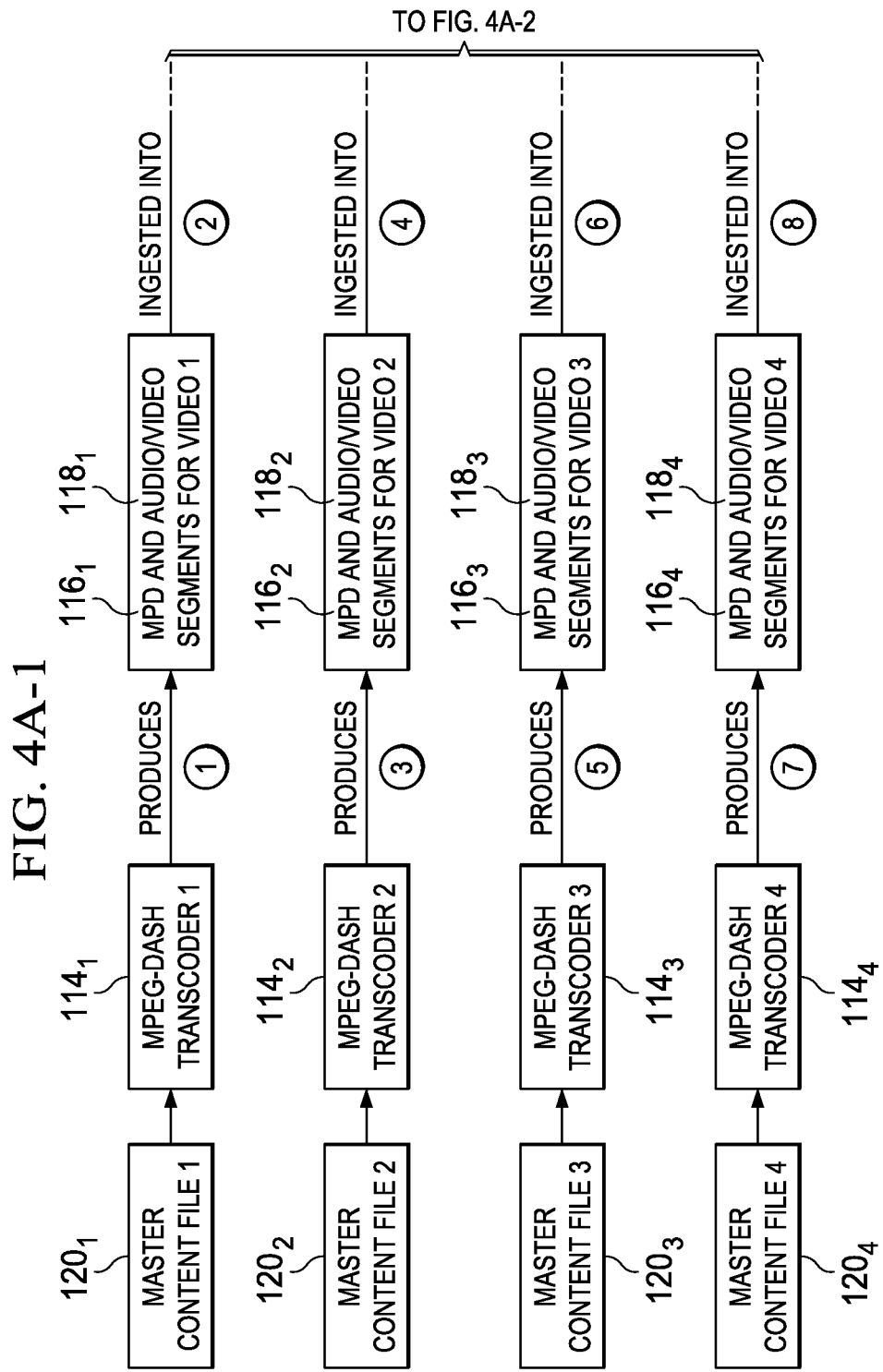
Figures 2, 4A:
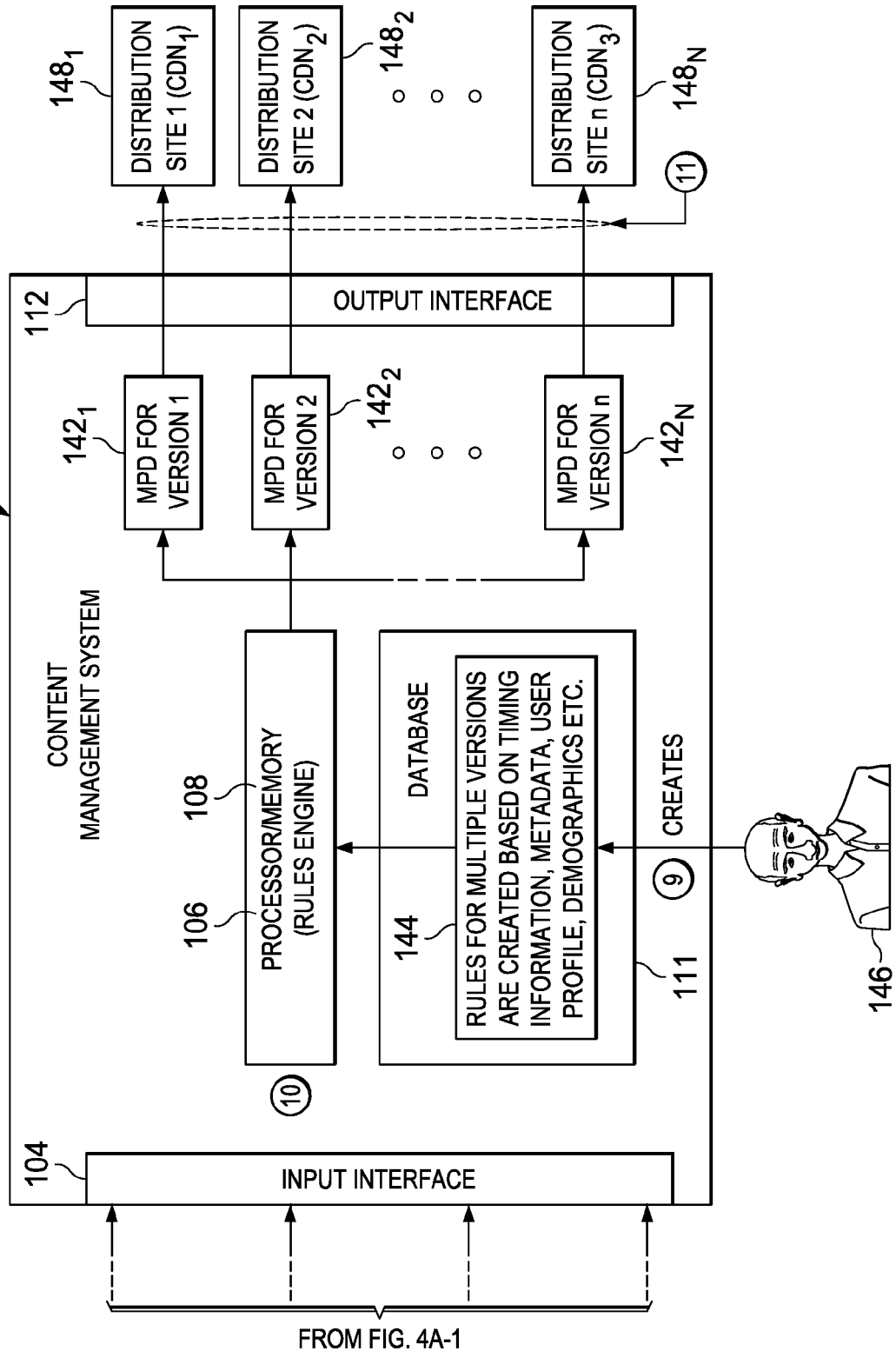
Figure 4B:
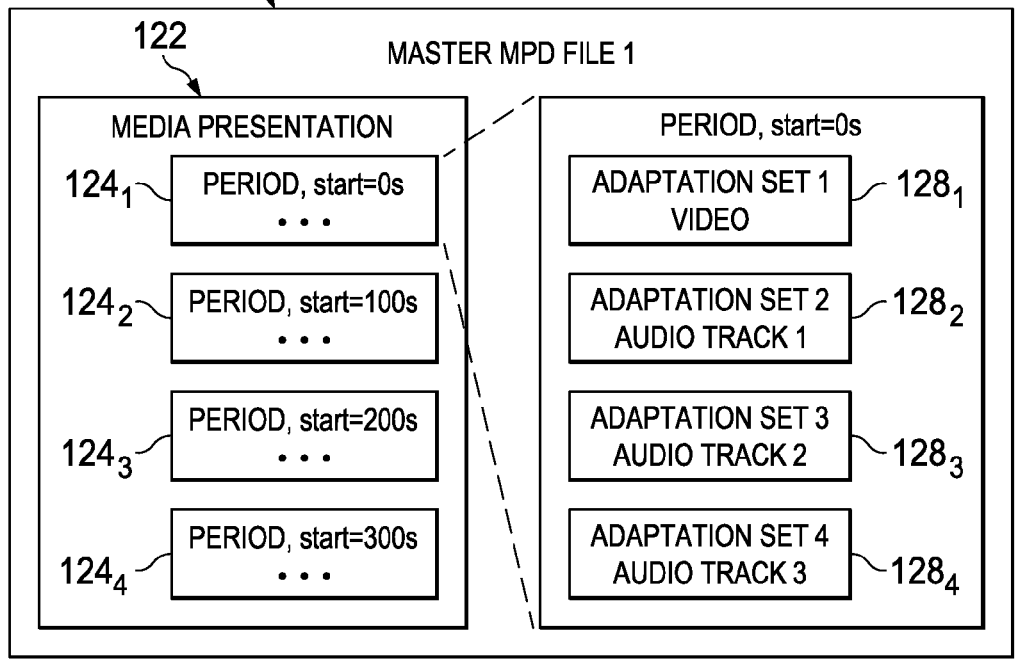
Figure 4C:
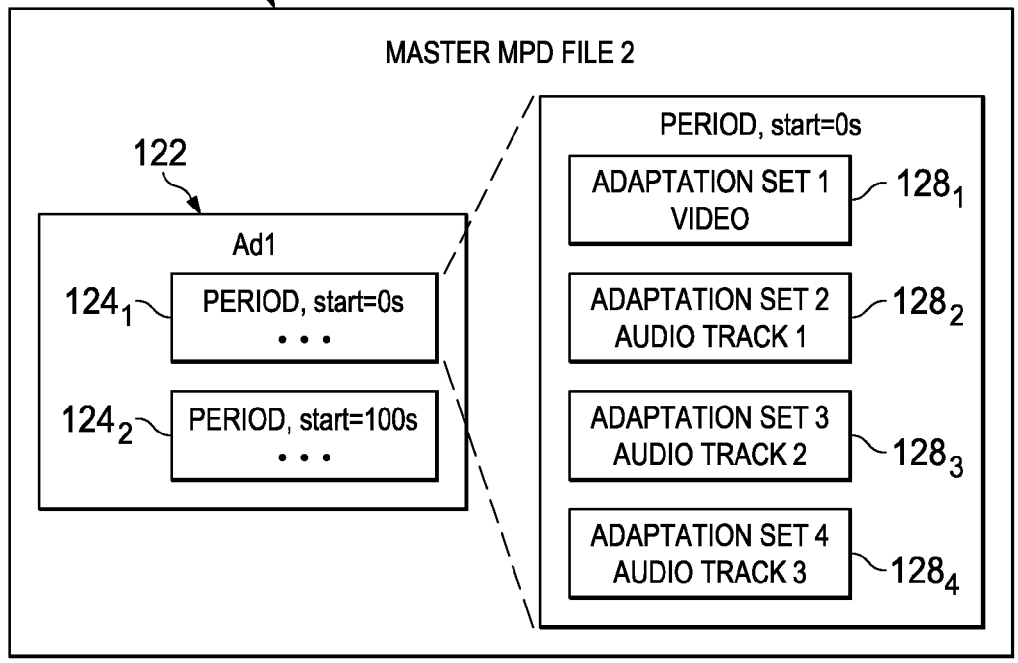
Figure 4E:
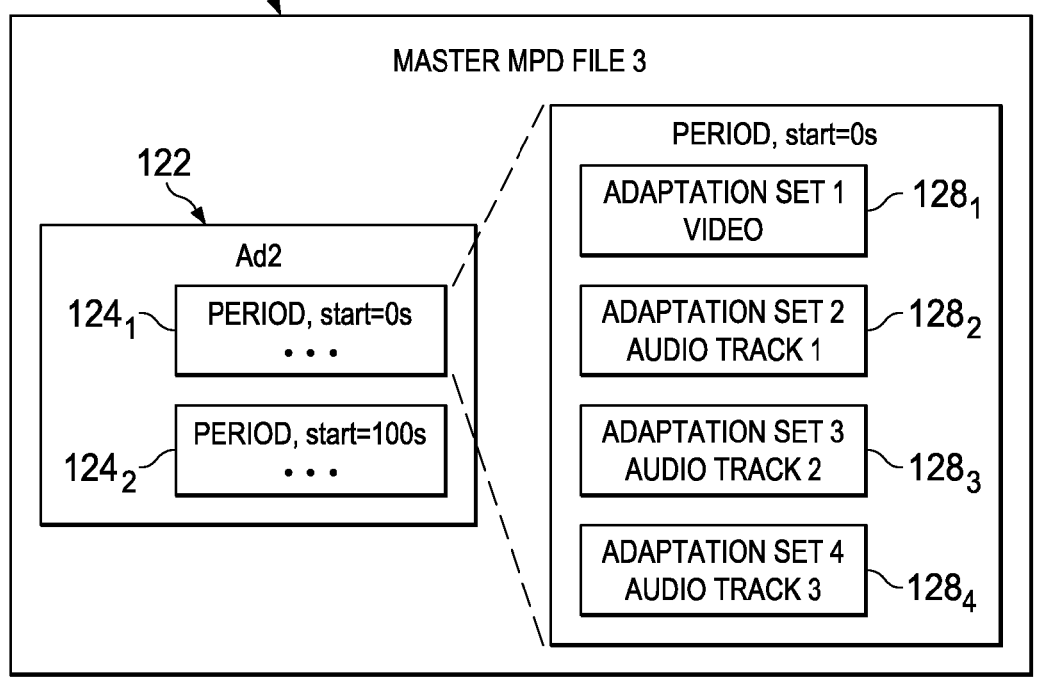
Figure 4F:
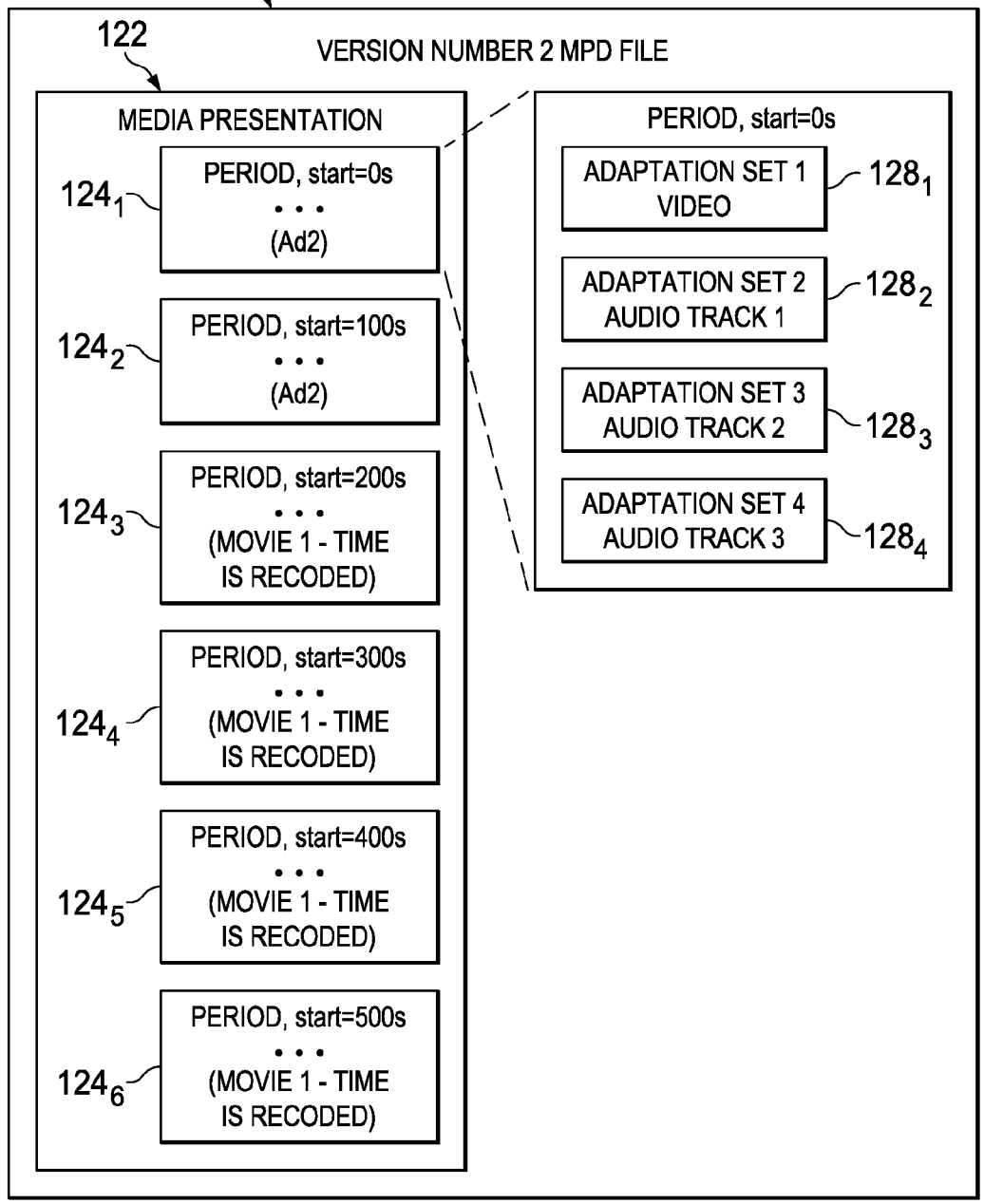
Figure 4G:
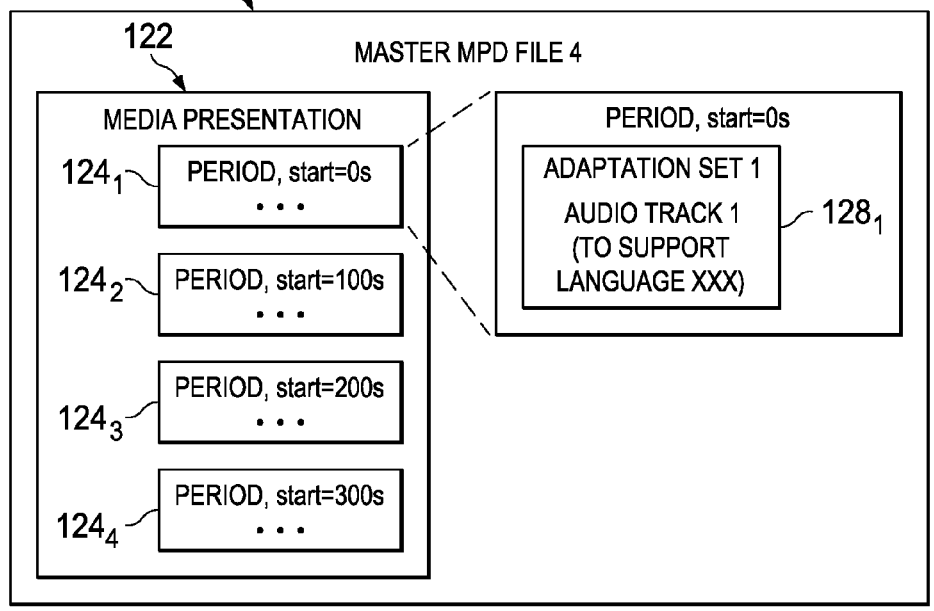
Figure 4H:
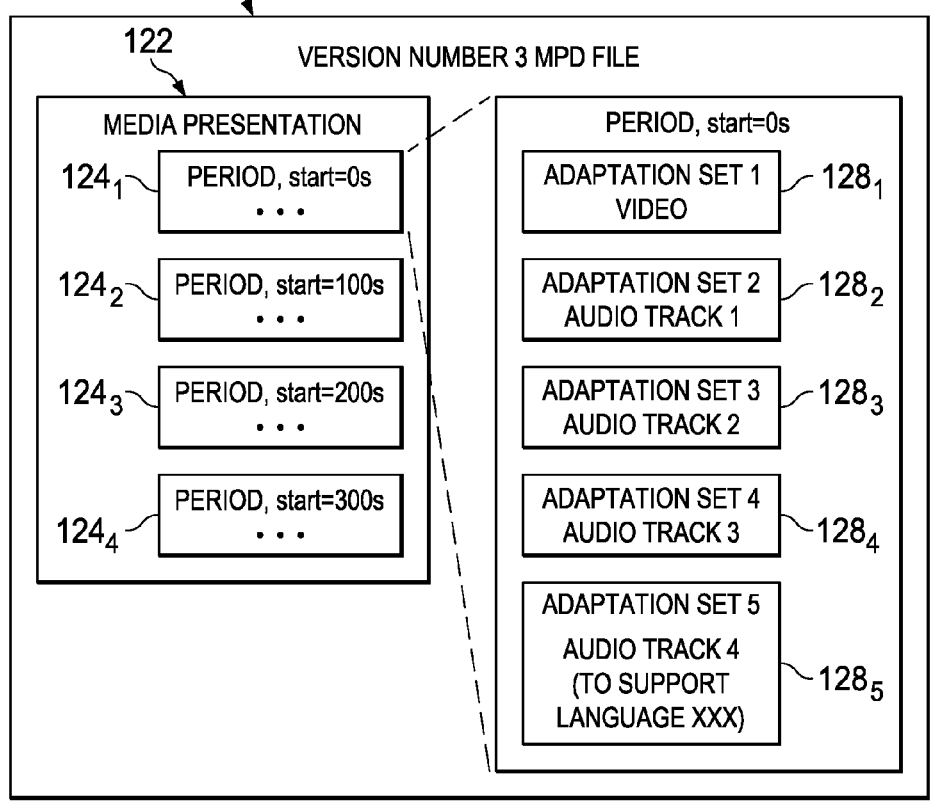

Referring to FIGS. 4A-4H, there are several diagrams associated with an exemplary content management system 100' which are used to explain a use case #2 in accordance with an embodiment of the present invention. As shown in FIGS. 4A1 and 4A2, the content management system 100' includes the input interface 104, the processor 106, the memory 108, the database 111, and the output interface 112. In this particular example, the system's input interface 104 is shown interfacing with four remote transcoders $114_1$, $114_2$, $114_3$, $114_4$ and respectively receiving therefrom three source descriptor files $116_1$, $116_2$, $116_3$, $116_4$ (e.g., MPD files) and their associated adaptive bit rate segments $118_1$, $118_2$, $118_3$, $118_4$. As shown, the remote transcoders $114_1$, $114_2$, $114_3$, $114_4$ respectively receive the master content files $120_1$, $120_2$, $120_3$, $120_4$ and produce the corresponding source descriptor files $116_1$, $116_2$, $116_3$, $116_4$ and their associated adaptive bit rate segments $118_1$, $118_2$, $118_3$, $118_4$. The basic steps associated with the use case #2 are as follows:

1. The MPEG-DASH transcoder $114_1$ provides the MPD file $116_1$ and the adaptive bit rate segments $118_1$ for the master content file $120_1$.
2. The MPEG-DASH transcoder's $114_1$ output namely the MPD file $116_1$ and the adaptive bit rate segments $118_1$ are received by the content management system 100'. Note: The MPD file $116_1$ and the adaptive bit rate segments $118_1$ can be received from any other device as well instead of the MPEG-DASH transcoder $114_1$.
3. The MPEG-DASH transcoder $114_2$ provides the MPD file $116_2$ and the adaptive bit rate segments $118_2$ for the master content file $120_2$.
4. The MPEG-DASH transcoder's $114_2$ output namely the MPD file $116_2$ and
the adaptive bit rate segments $118_2$ are received by the content management system 100'. Note: The MPD file $116_2$ and the adaptive bit rate segments $118_2$ can be received from any other device as well instead of the MPEG-DASH transcoder $114_2$.
5. The MPEG-DASH transcoder $114_3$ provides the MPD file $116_3$ and the adaptive bit rate segments $118_3$ for the master content file $120_3$.
6. The MPEG-DASH transcoder's $114_3$ output namely the MPD file $116_3$ and the adaptive bit rate segments $118_3$ are received by the content management system 100'. Note: The MPD file $116_3$ and the adaptive bit rate segments $118_3$ can be received from any other device as well instead of the MPEG-DASH transcoder $114_3$.
7. The MPEG-DASH transcoder $114_4$ provides the MPD file $116_4$ and the adaptive bit rate segments $118_4$ for the master content file $120_4$.
8. The MPEG-DASH transcoder's $114_4$ output namely the MPD file $116_4$ and the adaptive bit rate segments $118_4$ are received by the content management system 100'. Note: The MPD file $116_4$ and the adaptive bit rate segments $118_4$ can be received from any other device as well instead of the MPEG-DASH transcoder $114_4$.
9. The user 146 creates rules 144 which provide details on how to create the multiple versions of MPD files $142_1$, $142_2 \ldots 142_n$. The rules 144 can be and not limited to, based on timing information, metadata, user profiles, content ratings, regional and demographic information etc.
10. The processor 106-memory 108 (e.g., rules engine) uses the rules 144, the MPD files $116_1$, $116_2$, $116_3$, $116_4$ and the adaptive bit rate segments $118_1$, $118_2$, $118_3$, $118_4$ to create the multiple versions of MPD files $142_1$, $142_2 \ldots 142_n$.
    A. An example is discussed next to help explain several ways that the processor 106-memory 108 (e.g., rules engine) can use the rules 144 plus the master MPD file $116_1$ (movie content) and the master MPD file $116_2$ (advertisement content) to create MPD file $142_1$. The final output MPD file $142_1$ can be a combination of these two master MPD files $116_1$ and $116_2$ in a specific certain order. In this example, FIG. 4B illustrates a portion of the MPD file $116_1$ (e.g., master MPD file 1 $116_1$) which has a media presentation 122 with multiple periods $124_1$, $124_2$, $124_3$, $124_4$ and the first period $124_1$ includes adaptation sets $128_1$, $128_2$, $128_3$, $128_4$. FIG. 4C illustrates a portion of the MPD file 2 $116_2$ (e.g., master MPD file 2 $116_2$) which has an advertisement presentation 122 with multiple periods $124_1$ and $124_2$ and the first period $124_1$ includes adaptation sets $128_1$, $128_2$, $128_3$, $128_4$. FIG. 4D illustrates a portion of the "version 1" MPD file $142_1$ which was created by the processor 106-memory 108 (e.g., rules engine) when using the rule 144 which is set to add the advertisement presentation 122 of master MPD file 2 $116_2$ to master MPD file 1 $116_1$ and to recode the time in the newly created "version 1" MPD file $142_1$. The "version 1" MPD file $142_1$ includes a media presentation 122 with periods $124_1$ and $124_2$ (which contain the advertisement presentation 122 of master MPD file 2 $116_2$) and periods $124_3$, $124_4$, $124_5$, and $124_5$ (which contain the media presentation 122 of master MPD file 1 $116_1$ but with recoded times). It should be noted that the advertisement presentation 122 of master MPD file 2 $116_2$ can be added at any place in the master MPD file 1 $116_1$ to create "version 1" MPD file $142_1$.
    B. An example is discussed next to help explain several ways that the processor 106-memory 108 (e.g., rules engine) can use the rules 144 plus the master MPD file $116_1$ (movie content) and the master MPD file $116_3$ (advertisement content) to create MPD file $142_2$. The final output MPD file $142_2$ can be a combination of these two master MPD files $116_1$ and $116_3$ in a specific certain order. In this example, FIG. 4B illustrates a portion of the MPD file $116_1$ (e.g., master MPD file 1 $116_1$) which has a media presentation 122 with multiple periods $124_1$, $124_2$, $124_3$, $124_4$ and the first period $124_1$ includes adaptation sets $128_1$, $128_2$, $128_3$, $128_4$. FIG. 4E illustrates a portion of the MPD file 3 $116_3$ (e.g., master MPD file 3 $116_3$) which has an advertisement presentation 122 with multiple periods $124_1$ and $124_2$ and the first period $124_1$ includes adaptation sets $128_1$, $128_2$, $128_3$, $128_4$. FIG. 4F illustrates a portion of the "version 2" MPD file $142_2$ which was created by the processor 106-memory 108 (e.g., rules engine) when using the rule 144 which is set to add the advertisement presentation 122 of master MPD file 3 $116_3$ to master MPD file 1 $116_1$ and to recode the time in the newly created "version 2" MPD file $142_2$. The "version 2" MPD file $142_2$ includes a media presentation 122 with periods $124_1$ and $124_2$ (which contain the advertisement presentation 122 of master MPD file 3 $116_3$) and periods $124_3$, $124_4$, $124_5$, and $124_6$ (which contain the media presentation 122 of master MPD file 1 $116_1$ but with recoded times). It should be noted that the advertisement presentation 122 of master MPD file 3 $116_3$ can be added at any place in the master MPD file 1 $116_1$ to create "version 2" MPD file $142_2$.
    Note: The same logic associated with examples A and B can be applied to combine multiple movie contents and not just one movie content and advertising content.
    C. An example is discussed next to help explain several ways that the processor 106-memory 108 (e.g., rules engine) can use the rules 144 plus the master MPD file $116_1$ (movie content) and the master MPD file $116_4$ (audio content) to create MPD file $142_3$. The final output MPD file $142_3$ is a combination of these two master MPD files $116_1$ and $116_4$. In this example, FIG. 4B illustrates a portion of the MPD file $116_1$ (e.g., master MPD file 1 $116_1$) which has a media presentation 122 with multiple periods $124_1$, $124_2$, $124_3$, $124_4$ and the first period $124_1$ includes adaptation sets $128_1$, $128_2$, $128_3$, $128_4$. FIG. 4G illustrates a portion of the MPD file 4 $116_4$ (e.g., master MPD file 4 $116_4$) which has a media presentation 122 with multiple periods $124_1$, $124_2$, $124_3$, $124_4$ and the first period $124_1$ includes adaptation set $128_1$. FIG. 4H illustrates a portion of the "version 3" MPD file $142_3$ which was created by the processor 106-memory 108 (e.g., rules engine) when using the rule 144 which is set to add the media presentation 122 of master MPD file 4 $116_4$ to master MPD file 1 $116_1$. The "version 3" MPD file $142_3$ includes a media presentation 122 with multiple periods $124_1$, $124_2$, $124_3$, $124_4$ and the first period $124_1$ includes adaptation sets $128_1$, $128_2$, $128_3$, $128_4$, $128_5$ (where adaptation set $128_5$ includes the audio track from master MPD file 4 $116_4$—the other periods $124_2$, $124_3$, $124_4$ would also have adaptation sets which include the audio track from master MPD file 4 $116_4$).

11. The processor 106-memory 108 then distributes the different versions of MPD files $142_1$, $142_2$ ... $142_n$ to corresponding downstream systems $148_1$, $148_2$ ... $148_n$ (e.g., content delivery networks $148_1$, $148_2$ ... $148_n$) based on requirements.

Note 1: In FIG. 4A, versioned MPD files $142_1$, $142_2$ ... $142_n$ are presented as output of the processor 106-memory 108 (e.g., rule engine). In this case, the processor 106-memory 108 (e.g., rule engine) dynamically generates the versioned MPD files $142_1$, $142_2$ ... $142_n$ on the fly and distributes them to the corresponding downstream systems $148_1$, $148_2$ ... $148_n$. Alternatively, the processor 106-memory 108 (e.g., rule engine) can generate and store (cache) the versioned MPD files $142_1$, $142_2$ ... $142_n$ in the database 111 and then at some later time distribute them to the corresponding downstream systems $148_1$, $148_2$ ... $148_n$.

Note 2: The exemplary system 100' may include many other well known components but for clarity those well known components are not described herein while the components 104, 106, 108, 111 and 112 which are relevant to the invention have been described.

Note 3: The use case #2 included an example utilizing the DASH standard but it should be appreciated that the present invention is not limited to the DASH standard but could utilize other adaptive streaming technologies such as HLS by Apple, Smooth Streaming by Microsoft, or HDS by Adobe.

Referring to FIG. 5, there is a diagram an exemplary content delivery system 100" which is used to explain a use case #3 in accordance with an embodiment of the present invention. As shown, the content delivery system 100" includes the input interface 104, the processor 106, the memory 108, the database 111, and the output interface 112. In this particular example, the system's input interface 104 is shown interfacing with one remote transcoder $114_1$ and receiving therefrom one source descriptor file $116_1$ (MPD file $116_1$) and the associated adaptive bit rate segments $118_1$. The remote transcoder $114_1$ receives the master content file $120_1$ and produces the corresponding source descriptor file $116_1$ and the associated adaptive bit rate segments $118_1$. The basic steps associated with the use case #3 are as follows:

1. The MPEG-DASH transcoder $114_1$ provides the MPD file $116_1$ and the adaptive bit rate segments $118_1$ for the master content file $120_1$.
2. The MPEG-DASH transcoder's $114_1$ output namely the MPD file $116_1$ and the adaptive bit rate segments $118_1$ are received by the content delivery system 100". Note: The MPD file $116_1$ and the adaptive bit rate segments $118_1$ can be received from any other device as well instead of the MPEG-DASH transcoder $114_1$.
3. The user 146 creates rules 144 which provide details on how to create the multiple versions of MPD files $142_1$, $142_2$ ... $142_n$. The rules 144 can be and not limited to, based on timing information, metadata, user profiles, content ratings, regional and demographic information etc.
4. The processor 106-memory 108 (e.g., rules engine) uses the rules 144, the MPD file $116_1$ and the adaptive bit rate segments $118_1$ to create the multiple versions of MPD files $142_1$, $142_2$ ... $142_n$. The examples described above with respect to FIGS. 3B-3D can also be performed by the content delivery system 100" in use case #3 as well.
5. The processor 106-memory 108 then distributes the different versions of MPD files $142_1$, $142_2$ ... $142_n$ to corresponding downstream systems $148_1$, $148_2$ ... $148_n$ (e.g., individual users $148_1$, $148_2$ ... $148_n$) based on requirements. For instance, when anyone of the individual users $148_1$, $148_2$ ... $148_n$ sends a request for a particular content, the processor 106-memory 108 can utilize a resolving mechanism 145 along with different types of user information to determine the specific version of the MPD file $142_1$, $142_2$ ... $142_n$ which needs to be sent to that particular individual user $148_1$.

The resolving mechanism 145 can utilize various implicit and explicit inputs collected from the device associated with the individual user $148_1$. For instance, these inputs can include user's location (implicit), the user's customer profile information (age, sex), the user's previous history and explicit information such as the user's preference, occupation, personal interest etc. For resolving to select the proper MPD file $142_1$, $142_2$ ... $142_n$ which includes certain segments or not, the resolving mechanism 145 can use rules which can be defined such as:

A. If country=='China', then the resolving mechanism 145 selects a MPD file $142_1$, $142_2$ ... $142_n$ which does not include time codes 00:1:30 to 00:2:15 since the video associated with these time-codes contain dialogue which needs to be censored due to government regulations.

B. If age>=18 and preference=='No Violence', then the resolving mechanism 145 selects a MPD file $142_1$, $142_2$ ... $142_n$ which does not include time codes 00:05:30 to 00:05:45 etc since the video associated with these time-codes contains "violent" subject matter.

Note: These time codes and rule information can be collected in any content delivery system or in a steam server itself. The rules mentioned above may not be limited to those options and formats. In fact, the rules can be collected in Extensible Markup Language (XML) format or any proprietary format and various types of operators can provide rules to enrich the resolving mechanism 145. If desired, the content management system 100' may also utilize a resolving mechanism 145 to determine which MPD file(s) $142_1$, $142_2$ ... $142_n$ to distribute to downstream systems $148_1$, $148_2$ ... $148_n$ (e.g., content delivery systems).

Note 1: In FIG. 5, versioned MPD files $142_1, 142_2 \ldots 142_n$ are presented as output of the processor 106-memory 108 (e.g., rule engine). In this case, the processor 106-memory 108 (e.g., rule engine) dynamically generates the versioned MPD files $142_1, 142_2 \ldots 142_n$ on the fly and distributes them to the corresponding downstream systems $148_1, 148_2 \ldots 148_n$. Alternatively, the processor 106-memory 108 (e.g., rule engine) can generate and store (cache) the versioned MPD files $142_1, 142_2 \ldots 142_n$ in the database 111 and then at some later time distribute them to the corresponding downstream systems $148_1, 148_2 \ldots 148_n$.

Note 2: The exemplary system 100'' may include many other well known components but for clarity those well known components are not described herein while the components 104, 106, 108, 111 and 112 which are relevant to the invention have been described.

Note 3: The use case #3 included an example utilizing the DASH standard but it should be appreciated that the present invention is not limited to the DASH standard but could utilize other adaptive streaming technologies such as HLS by Apple, Smooth Streaming by Microsoft, or HDS by Adobe.

Referring to FIGS. 6A-6B, there are diagrams of an exemplary content delivery system 100'' which is used to explain a use case #3 in accordance with an embodiment of the present invention. As shown, the exemplary content delivery system 100'' includes the input interface 104, the processor 106, the memory 108, the database 111, and the output interface 112. In this particular example, the system's input interface 104 is shown interfacing with four remote transcoders $114_1, 114_2, 114_3, 114_4$ and respectively receiving therefrom three source descriptor files $116_1, 116_2, 116_3, 116_4$ (e.g., MPD files) and their associated adaptive bit rate segments $118_1, 118_2, 118_3, 118_4$. As shown, the remote transcoders $114_1, 114_2, 114_3, 114_4$ respectively receive the master content files $120_1, 120_2, 120_3, 120_4$ and produce the corresponding source descriptor files $116_1, 116_2, 116_3, 116_4$ and their associated adaptive bit rate segments $118_1, 118_2, 118_3, 118_4$. The basic steps associated with the use case #4 are as follows:

1. The MPEG-DASH transcoder $114_1$ provides the MPD file $116_1$ and the adaptive bit rate segments $118_1$ for the master content file $120_1$.
2. The MPEG-DASH transcoder's $114_1$ output namely the MPD file $116_1$ and the adaptive bit rate segments $118_1$ are received by the content management system 100'. Note: The MPD file $116_1$ and the adaptive bit rate segments $118_1$ can be received from any other device as well instead of the MPEG-DASH transcoder $114_1$.
3. The MPEG-DASH transcoder $114_2$ provides the MPD file $116_2$ and the adaptive bit rate segments $118_2$ for the master content file $120_2$.
4. The MPEG-DASH transcoder's $114_2$ output namely the MPD file $116_2$ and the adaptive bit rate segments $118_2$ are received by the content management system 100'. Note: The MPD file $116_2$ and the adaptive bit rate segments $118_2$ can be received from any other device as well instead of the MPEG-DASH transcoder $114_2$.
5. The MPEG-DASH transcoder $114_3$ provides the MPD file $116_3$ and the adaptive bit rate segments $118_3$ for the master content file $120_3$.
6. The MPEG-DASH transcoder's $114_3$ output namely the MPD file $116_3$ and the adaptive bit rate segments $118_3$ are received by the content management system 100'. Note: The MPD file $116_3$ and the adaptive bit rate segments $118_3$ can be received from any other device as well instead of the MPEG-DASH transcoder $114_3$.
7. The MPEG-DASH transcoder $114_4$ provides the MPD file $116_4$ and the adaptive bit rate segments $118_4$ for the master content file $120_4$.
8. The MPEG-DASH transcoder's $114_4$ output namely the MPD file $116_4$ and the adaptive bit rate segments $118_4$ are received by the content management system 100'. Note: The MPD file $116_4$ and the adaptive bit rate segments $118_4$ can be received from any other device as well instead of the MPEG-DASH transcoder $114_4$.
9. The user 146 creates rules 144 which provide details on how to create the multiple versions of MPD files $142_1, 142_2 \ldots 142_n$. The rules 144 can be and not limited to, based on timing information, metadata, user profiles, content ratings, regional and demographic information etc.
10. The processor 106-memory 108 (e.g., rules engine) uses the rules 144, the MPD file $116_1$ and the adaptive bit rate segments $118_1$ to create the multiple versions of MPD files $142_1, 142_2 \ldots 142_n$. The examples described above with respect to FIGS. 4B-4H can also be performed by the content delivery system 100'' in use case #4 as well.
11. The processor 106-memory 108 then distributes the different versions of MPD files $142_1, 142_2 \ldots 142_n$ to corresponding downstream systems $148_1, 148_2 \ldots 148_n$ (e.g., individual users $148_1, 148_2 \ldots 148_n$) based on requirements. For instance, when anyone of the individual users $148_1, 148_2 \ldots 148_n$ sends a request for a particular content, the processor 106-memory 108 can utilize a resolving mechanism 145 along with different types of user information to determine the specific version of the MPD file $142_1, 142_2 \ldots 142_n$ which needs to be sent to that particular individual user $148_1$.

The resolving mechanism 145 can utilize various implicit and explicit inputs collected from the device associated with the individual user $148_1$. For instance, these inputs can include user's location (implicit), the user's customer profile information (age, sex), the user's previous history and explicit information such as the user's preference, occupation, personal interest etc. For resolving to select the proper MPD file $142_1, 142_2 \ldots 142_n$ which includes certain segments or not, the resolving mechanism 145 can use rules which can be defined such as:

A. If country=='China', then the resolving mechanism 145 selects a MPD file $142_1, 142_2 \ldots 142_n$ which does not include time codes 00:1:30 to 00:2:15 since the video associated with these time-codes contain dialogue which needs to be censored due to government regulations.

B. If age>=18 and preference=='No Violence', then the resolving mechanism 145 selects a MPD file $142_1, 142_2 \ldots 142_n$ which does not include time codes 00:05:30 to 00:05:45 etc since the video associated with these time-codes contains "violent" subject matter.

Note: These time codes and rule information can be collected in any content delivery system or in a steam server itself. The rules mentioned above may not be limited to those options and formats. In fact, the rules can be collected in Extensible Markup Language (XML) format or any proprietary format and various types of operators can provide rules to enrich the resolving mechanism 145. If desired, the content management system 100' may also utilize a resolving mechanism 145 to determine which MPD file(s) $142_1$, $142_2 \ldots 142_n$ to distribute to downstream systems $148_1, 148_2 \ldots 148_n$ (e.g., content delivery systems).

Note 1: In FIG. 6, versioned MPD files $142_1, 142_2 \ldots 142_n$ are presented as output of the processor 106-memory 108 (e.g., rule engine). In this case, the processor 106-memory 108 (e.g., rule engine) dynamically generates the versioned MPD files $142_1, 142_2 \ldots 142_n$ on the fly and distributes them to the corresponding downstream systems $148_1, 148_2 \ldots 148_n$. Alternatively, the processor 106-memory 108 (e.g., rule engine) can generate and store (cache) the versioned MPD files $142_1, 142_2 \ldots 142_n$ in the database 111 and then at some later time distribute them to the corresponding downstream systems $148_1, 148_2 \ldots 148_n$.

Note 2: The exemplary system 100" may include many other well known components but for clarity those well known components are not described herein while the components 104, 106, 108, 111 and 112 which are relevant to the invention have been described.

Note 3: The use case #4 included an example utilizing the DASH standard but it should be appreciated that the present invention is not limited to the DASH standard but could utilize other adaptive streaming technologies such as HLS by Apple, Smooth Streaming by Microsoft, or HDS by Adobe.

From the foregoing, one skilled in the art with the teaching herein will readily appreciate that the system 100, 100' and 100" and method 200 are configured receiving one or more source descriptor files $116_1, 116_2 \ldots 116_n$ (e.g., MPD files, HLS m3u8 files, HTTP manifest files) along with their associated adaptive bit rate segments $118_1, 118_2 \ldots 118_n$. The system 100, 100' and 100" and method 200 are also configured for receiving rules 144 (e.g., content ratings, timing information, user profiles, regional and demographic information) and then creating multiple descriptor files $142_1, 142_2 \ldots 142_n$ based on the received rules 144 and the one or more source descriptor files $116_1, 116_2 \ldots 116_n$ The system 100, 100' and 100" and method 200 are further configured for distributing the multiple descriptor files $142_1, 142_2 \ldots 142_n$ to one or more downstream systems $148_1, 148_2 \ldots 148_n$ (e.g., content delivery systems, users). This is all possible in part because with adaptive streaming technology, the content files $120_1, 120_2 \ldots 120_n$ are split into multiple segments which are linked together by their respective source descriptor files $116_1, 116_2 \ldots 116_n$. The system 100, 100' and 100' can take these descriptor files $116_1, 116_2 \ldots 116_n$ and dynamically generate based on certain rules 144 (to add/remove segments) multiple descriptor files $142_1, 142_2 \ldots 142_n$. For instance, since MPEG-DASH supports playing multiple tracks this means that the system 100, 100' and 100" can combine a video track from one set of segments in one source descriptor file $116_1$ and audio tracks from another set of segments in another source descriptor file $116_2$ to create descriptor file $142_1$. This is possible because per MPEG-DASH the segments are provided with HTTP URLs so the system 100, 100' and 100" can provide link contents from different sources and dynamically generate versions of contents. This can be done during the content preparation using a content management system or in content delivery network's cache servers.

The system 100, 100' and 100" is a marked-improvement over the prior art since it can avoid having to create multiple versions of a content file by taking one content file and creating multiple versions of the descriptor file. In this way, maintenance will be reduced and also the storage requirements will be reduced. The system 100, 100' and 100" can dynamically create multiple versions of descriptor files $142_1, 142_2 \ldots 142_n$ and all that is need is to maintain rules 144 which indicate when to include or exclude contents by time codes. Additionally the time to create new versions will be reduced significantly and the savings would be substantial when the content needs to be supported in multiple devices in multiple formats for adaptive steaming. The following are some additional advantages associated with the present invention:

- The segments from one source descriptor file $116_1$ can be removed and/or added based on rules 144.
- The segments from multiple master files $116_1, 116_2 \ldots 116_n$ can be combined together to create new version descriptor files $142_1, 142_2 \ldots 142_n$.
- The individual tracks from one source descriptor file $116_1$ can be modified if needed: such as adding and/or removing particular audio tracks.
- The new versions of descriptor files $142_1, 142_2 \ldots 142_n$ can be created during distribution to the end users $148_1, 148_2 \ldots 148_n$ or during content preparation time by both. This provides flexibility for the operators to define various versions of descriptor files $142_1, 142_2 \ldots 142_n$ at any time without adding content processing (transcoding, quality check etc) overhead and storage overhead.
- If the versions of descriptor files $142_1, 142_2 \ldots 142_n$ are created in the content management system 100', then various versions can be stored as rule information as opposed to individual media files for audit purposes.
- The multiple copies of same content file need not be stored for version purpose and hence less storage will be needed and it will be easier to manage.
- Multiple versions descriptor files $142_1, 142_2 \ldots 142_n$ are created with a single master source file $116_1$ (for example). So it reduces time and effort to create versions and simplifies business process.
- The versions of descriptor files $142_1, 142_2 \ldots 142_n$ are created dynamically based on rules 144. So it is easier to create new versions of descriptor files $142_1, 142_2 \ldots 142_n$.
- The service can be personalized based on user information thus providing better user experience.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A system configured for creating multiple descriptor files, the system comprising:
   a processor; and
   a memory that stores processor-executable instructions therein where the processor interfaces with the memory and executes the processor-executable instructions to enable the following operations:
   receiving one or more source descriptor files and associated adaptive bit rate segments for one or more master content files, wherein the one or more source descriptor files includes a media presentation which has multiple periods spliced together into specific time periods and refer to the associated adaptive bit rate segments;
   receiving rules which provide details on how the multiple descriptor files are to be created;
   creating the multiple descriptor files based on the rules and the one and more source descriptor files, wherein the multiple descriptor files include a media presentation based on the media presentation from the one or more source descriptor files, and wherein the creating operation is implemented by manipulating at least one of the one or more source descriptor files based on the rules without transcoding the one or more source descriptor files to an adaptive stream format and without generating new content files to create the multiple descriptor files; and distributing one or more of the multiple descriptor files to one or more downstream systems.

2. The system of claim 1, wherein the received one or more source descriptor files further comprises:
one or more Hypertext Transfer Protocol (HTTP) Live Stream (HLS) m3u8 files;
one or more Hypertext Transfer Protocol (HTTP) manifest files; or
one or more media presentation description (MPD) files.

3. The system of claim 1, wherein the rules include one or more of the following:
content ratings;
language information;
timing information;
metadata;
user profiles; and
regional and demographic information.

4. The system of claim 1, wherein the processor executes the processor-executable instructions to implement the creating operation by dynamically creating the multiple descriptor files while the multiple descriptor files are being distributed to the one or more downstream systems.

5. The system of claim 1, wherein the processor executes the processor-executable instructions to implement the creating operation by creating the multiple descriptor files and storing the multiple descriptor files before the multiple descriptor files are being distributed to the one or more downstream systems.

6. The system of claim 1, wherein the processor executes the processor-executable instructions to implement the manipulating operation by removing at least one period including a video track and an audio track from one of the one or more source descriptor files and recoding time information within the one of the one or more source descriptor files to create one of the multiple descriptor files.

7. The system of claim 1, wherein the processor executes the processor-executable instructions to implement the manipulating operation by removing an audio track from one of the one or more source descriptor files to create one of the multiple descriptor files.

8. The system of claim 1, wherein the processor executes the processor-executable instructions to implement the manipulating operation by adding advertisements from one or more of the source descriptor files to another one of the source descriptor files to create one of the multiple descriptor files.

9. The system of claim 1, wherein the processor executes the processor-executable instructions to implement the manipulating operation by adding one or more periods each including a video track and an audio track from one of the one or more source descriptor files to one of the other source files to create one of the multiple descriptor files.

10. The system of claim 1, wherein the processor executes the processor-executable instructions to implement the manipulating operation by adding one or more audio tracks from one of the one or more source descriptor files to one of the other source files to create one of the multiple descriptor files.

11. The system of claim 1, wherein the processor executes the processor-executable instructions to implement the distributing operation by resolving which one of the multiple descriptor files to send to each of the downstream systems.

12. The system of claim 1, wherein the system is a content management system and the downstream systems are content delivery networks.

13. The system of claim 1, wherein the system is a content delivery network and the downstream systems are individual users.

14. A method for creating multiple descriptor files, the method implemented by a system comprising the steps of:
receiving one or more source descriptor files and associated adaptive bit rate segments for one or more master content files, wherein the one or more source descriptor files includes a media presentation which has multiple periods spliced together into specific time periods and refer to the associated adaptive bit rate segments;
receiving rules which provide details on how the multiple descriptor files are to be created;
creating the multiple descriptor files based on the rules and the one and more source descriptor files, wherein the multiple descriptor files include a media presentation based on the media presentation from the one or more source descriptor files, and the creating further comprises manipulating at least one of the one or more source descriptor files based on the rules without transcoding the one or more source descriptor files to an adaptive stream format and without generating new content files to create the multiple descriptor files; and
distributing one or more of the multiple descriptor files to one or more downstream systems.

15. The method of claim 14, wherein the received one or more source descriptor files further comprises:
one or more Hypertext Transfer Protocol (HTTP) Live Stream (HLS) m3u8 files;
one or more Hypertext Transfer Protocol (HTTP) manifest files; or
one or more media presentation description (MPD) files.

16. The method of claim 14, wherein the rules include one or more of the following:
content ratings;
language information;
timing information;
metadata;
user profiles; and
regional and demographic information.

17. The method of claim 14, wherein the creating step further comprises dynamically creating the multiple descriptor files while the multiple descriptor files are being distributed to the one or more downstream systems.

18. The method of claim 14, wherein the creating step further comprises creating the multiple descriptor files and storing the multiple descriptor files before the multiple descriptor files are being distributed to the one or more downstream systems.

19. The method of claim 14, wherein the manipulating step further comprises steps of removing at least one period including a video track and an audio track from one of the one or more source descriptor files and recoding time information within the one of the one or more source descriptor files to create one of the multiple descriptor files.

20. The method of claim 14, wherein the manipulating step further comprises a step of removing an audio track from one of the one or more source descriptor files to create one of the multiple descriptor files.

21. The method of claim 14, wherein the manipulating step further comprises a step of adding advertisements from one or more of the source descriptor files to another one of the source descriptor files to create one of the multiple descriptor files.

22. The method of claim 14, wherein the manipulating step further comprises a step of adding one or more periods each including a video track and an audio track from one of the one or more source descriptor files to one of the other source files to create one of the multiple descriptor files.

23. The method of claim 14, wherein the manipulating step further comprises a step of adding one or more audio tracks from one of the one or more source descriptor files to one of the other source files to create one of the multiple descriptor files.

24. The method of claim 14, wherein the distributing step further comprises a step of resolving which one of the multiple descriptor files to send to each of the downstream systems.

25. The method of claim 14, wherein the system is a content management system and the downstream systems are content delivery networks.

26. The method of claim 14, wherein the system is a content delivery network and the downstream systems are individual users.

\* \* \* \* \*

UNITED STATES PATENT AND TRADEMARK OFFICE
CERTIFICATE OF CORRECTION

| | | |
|---|---|---|
| PATENT NO. | : 8,949,206 B2 | Page 1 of 1 |
| APPLICATION NO. | : 13/644792 | |
| DATED | : February 3, 2015 | |
| INVENTOR(S) | : Dhanapal | |

It is certified that error appears in the above-identified patent and that said Letters Patent is hereby corrected as shown below:

In the drawings

In Fig. 4A-2, Sheet 9 of 17, for Tag "$148_N$", in Line 2, delete "$(CDN_3)$" and insert -- $(CDN_N)$ --, therefor.

In the specification

In Column 4, Line 8, delete "subscription))," and insert -- subscription)). --, therefor.

In Column 4, Lines 39-40, delete "transoders" and insert -- transcoders --, therefor.

In Column 5, Line 47, delete "1111," and insert -- 111, --, therefor.

In Column 7, Lines 28-32, delete "the………$114_2$." and insert the same at Line 27, after "and", as a continuation paragraph.

In Column 8, Line 21, delete "$124_5$" and insert -- $124_6$ --, therefor.

In Column 13, Line 43, delete "and 100" and insert -- 100" --, therefor.

Signed and Sealed this
Seventh Day of June, 2016

Michelle K. Lee
*Director of the United States Patent and Trademark Office*